US011588621B2

(12) United States Patent
Angel et al.

(10) Patent No.: US 11,588,621 B2
(45) Date of Patent: Feb. 21, 2023

(54) EFFICIENT PRIVATE VERTICAL FEDERATED LEARNING

(71) Applicant: International Business Machines Corporation, Armonk, NY (US)

(72) Inventors: Nathalie Baracaldo Angel, San Jose, CA (US); Runhua Xu, Pittsburgh, PA (US); Yi Zhou, San Jose, CA (US); Ali Anwar, San Jose, CA (US); Heiko H. Ludwig, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 546 days.

(21) Appl. No.: 16/706,328

(22) Filed: Dec. 6, 2019

(65) Prior Publication Data
US 2021/0174243 A1 Jun. 10, 2021

(51) Int. Cl.
*H04L 9/08* (2006.01)
*H04L 9/30* (2006.01)
(Continued)

(52) U.S. Cl.
CPC ............. *H04L 9/08* (2013.01); *G06F 16/903* (2019.01); *G06N 20/00* (2019.01); *H04L 9/30* (2013.01)

(58) Field of Classification Search
CPC . H04L 9/08; H04L 9/30; H04L 9/0825; H04L 9/083; G06N 20/00; G06N 20/20
See application file for complete search history.

(56) References Cited

U.S. PATENT DOCUMENTS 7,131,004 B1 * 10/2006 Lyle ..................... H04L 9/12
713/169
10,332,639 B2   6/2019 Smurro
(Continued)

FOREIGN PATENT DOCUMENTS

CN 109189825 1/2019
CN 109299728 2/2019
(Continued)

OTHER PUBLICATIONS

Araki et al., "How to Choose Suitable Secure Multiparty Computation Using Generalized SPDZ," Communications Security, ACM, 2018, 3 pages.
(Continued)

*Primary Examiner* — Sarah Su
(74) *Attorney, Agent, or Firm* — Amin, Turocy & Watson, LLP

(57) ABSTRACT

Systems and techniques that facilitate universal and efficient privacy-preserving vertical federated learning are provided. In various embodiments, a key distribution component can distribute respective feature-dimension public keys and respective sample-dimension public keys to respective participants in a vertical federated learning framework governed by a coordinator, wherein the respective participants can send to the coordinator respective local model updates encrypted by the respective feature-dimension public keys and respective local datasets encrypted by the respective sample-dimension public keys. In various embodiments, an inference prevention component can verify a participant-related weight vector generated by the coordinator, based on which the key distribution component can distribute to the coordinator a functional feature-dimension secret key that can aggregate the encrypted respective local model updates into a sample-related weight vector. In various embodiments, the inference prevention component can verify the
(Continued)

sample-related weight vector, based on which the key distribution component can distribute to the coordinator a functional sample-dimension secret key that can aggregate the encrypted respective local datasets into an update value for a global model.

20 Claims, 16 Drawing Sheets

(51) Int. Cl.
  *G06F 16/903*   (2019.01)
  *G06N 20/00*   (2019.01)

(56) References Cited

U.S. PATENT DOCUMENTS

| | | | | |
|---|---|---|---|---|
| 2011/0246777 | A1* | 10/2011 | Buckley | H04W 12/08 713/172 |
| 2019/0042937 | A1 | 2/2019 | Sheller et al. | |
| 2021/0125446 | A1* | 4/2021 | Kinjo | G06Q 30/02 |
| 2021/0143987 | A1* | 5/2021 | Xu | H04L 9/14 |

FOREIGN PATENT DOCUMENTS

| | | | | |
|---|---|---|---|---|
| CN | 109492420 | | 3/2019 | |
| CN | 109635462 | | 4/2019 | |
| CN | 109711529 | A | 5/2019 | |
| CN | 109995522 | A * | 7/2019 | H04L 9/08 |
| CN | 113297573 | A * | 8/2021 | G06F 21/55 |
| CN | 114189343 | A * | 3/2022 | H04L 9/40 |
| KR | 20200085204 | A * | 7/2020 | H04L 9/0825 |
| WO | WO-2014184894 | A1 * | 11/2014 | G09C 1/00 |
| WO | WO-2017099117 | A1 * | 6/2017 | G09C 1/00 |
| WO | 201857302 | | 3/2018 | |
| WO | WO-2021138877 | A1 * | 7/2021 | G06N 20/00 |
| WO | WO-2021184836 | A1 * | 9/2021 | G06N 20/00 |

OTHER PUBLICATIONS

Shanks et al., "Class Number, A Theory of Factorization, and Genera," in Proc. of Symp. Math. Soc., 1971, vol. 20, 1971, 26 pages.
Bonawiiz et al., "Practical Secure Aggregation for Privacy-Preserving Machine Learning,". In Proceedings of the 2017 ACM SIGSAC Conference on Computer and Communications Security, ACM, Oct. 30-Nov. 3, 2017, 17 pages.
Papernot et al., "Scalable Private Learning with PATE," In Proceedings of the 2018 Sixth International Conference on Learning Representations, arXiv:1802.08908v1 [stat.ML], Feb. 24, 2018, 34 pages.
Ryffel et al., "A generic framework for privacy preserving deep learning," In Privacy Preserving Machine Learning, NeurIPS 2018 Workshop, arXiv:1811.04017v2 [cs.LG], Nov. 13, 2018, 5 pages.
Shokri et al., "Privacy-Preserving Deep Learning," CCS '15 Proceedings of the 22nd ACM SIGSAC Conference on Computer and Communications Security, Oct. 12-16, 2015, 12 pages.
Truex et al., "A Hybrid Approach to Privacy-Preserving Federated Learning," arXiv:1812.03224v2 [cs.LG], Aug. 14, 2019, 11 pages.
Abdalla et al., "Multi-Input Functional Encryption for Inner Products: Function-Hiding Realizations and Constructions without Pairings," Advances in Cryptology: Proc. of the 38th Annual Cryptology Conference (Crypto 2018), LNCS, vol. 10991, Jul. 25, 2018, 31 pages.
Abdalla et al., "Simple Functional Encryption Schemes for Inner Products," PKC 2015: Public-Key Cryptography, Mar. 17, 2015, 19 pages.
Hardy et al., "Private federated learning on vertically partitioned data via entity resolution and additively homomorphic encryption," arXiv:1711.10677v1 [cs.LG], Nov. 29, 2017, 60 pages.

Cheng et al., "SecureBoost: A Lossless Federated Learning Framework," arXiv:1901.08755v1 [cs.LG], Jan. 25, 2019, 12 pages.
Schnell et al., "A Novel Error-Tolerant Anonymous Linking Code," German Record Linkage Center, Working Paper Series No. WP-GRLC-2011-02, Sep. 22, 2011, 14 pages.
Mcmahan et al., "Communication-efficient learning of deep networks from decentralized data," arXiv preprint arXiv:1602.05629, Feb. 28, 2017, 11 pages.
Konecny et al., "Federated learning: Strategies for improving communication efficiency," arXiv preprint arXiv:1610.05492, 2016, 5 pages.
Nasr et al., "Comprehensive privacy analysis of deep learning: Stand-alone and federated learning under passive and active white-box inference attacks," in 2019 IEEE Symposium on Security and Privacy (SP). IEEE, Dec. 3, 2018, 15 pages.
Shokri et al., "Membership inference attacks against machine learning models," in 2017 IEEE Symposium on Security and Privacy (SP). IEEE, 2017, 16 pages.
Fredrikson et al., "Model inversion attacks that exploit confidence information and basic countermeasures," in Proceedings of the 22nd ACM SIGSAC Conference on Computer and Communications Security, ACM. ACM, 2015, 12 pages.
Dwork et al., "Differential Privacy and Robust Statistics," Proceedings of the forty-first annual ACM symposium on Theory of computing, May 31-Jun. 2, 2009, 10 pages.
Dwork et al., "Boosting and Differential Privacy," 2010 IEEE 51st Annual Symposium on Foundations of Computer Science, Oct. 23-26, 2010, 10 pages.
Abadi et al., "Deep Learning with Differential Privacy," arXiv:1607.00133v2 [stat.ML], Oct. 24, 2016, 14 pages.
Pettai et al., "Combining Differential Privacy and Secure Multiparty Computation," Proceedings of the 31st Annual Computer Security Applications Conference, Dec. 7-11, 2015, 10 pages.
Xu et al., "HybridAlpha: An Efficient Approach for Privacy-Preserving Federated Learning," in Proceedings of the 12th ACM Workshop on Artificial Intelligence and Security, Nov. 15, 2019, 11 pages.
Vaidya, "A Survey of Privacy-Preserving Methods Across Vertically Partitioned Data," Advances in Database Systems book series (ADBS, vol. 34), 2008, 22 pages.
Yu et al., "Privacy-Preserving SVM Classification on Vertically Partitioned Data," Advances in Knowledge Discovery and Data Mining—10th Pacific-Asia Conference, PAKDD 2006, Proceedings, Jul. 14, 2006, 10 pages.
Slavkovic et al., ""Secure" Logistic Regression of Horizontally and Vertically Partitioned Distributed Databases," Seventh IEEE International Conference on Data Mining Workshops, 2007, 6 pages.
Vaidya et al., "Privacy-Preserving Decision Trees over Vertically Partitioned Data," ACM Transactions on Knowledge Discovery from Data (TKDD), vol. 2, Issue 3, Article No. 14, Oct. 2008, 27 pages.
Gascon et al., "Secure linear regression on vertically partitioned datasets," Proceedings on Privacy Enhancing Technologies, 2017, 27 pages.
Damgard et al., A Generalisation, a Simplification and some Applications of Paillier's Probabilistic Public-Key System, in Lecture Notes in Computer Science 7(45), Dec. 2000, 21 pages.
Bottou et al., "Large-Scale Machine Learning with Stochastic Gradient Descent," Proceedings of COMPSTAT'2010, Sep. 2010, 10 pages.
Li et al., "Efficient Mini-batch Training for Stochastic Optimization," KDD '14 Proceedings of the 20th ACM SIGKDD international conference on Knowledge discovery and data mining, Aug. 24-27, 2014, 10 pages.
Lewko et al., "Fully Secure Functional Encryption: Attribute-BasedEncryption and (Hierarchical) Inner Product Encryption," Eurocrypt 2010: Advances in Cryptology, 2010, 56 pages.
Boneh et al., "Functional Encryption: Definitions and Challenges," TCC 2011: Theory of Cryptography, 2011, 24 pages.
Christen, "Data matching: concepts and techniques for record linkage, entity resolution, and duplicate detection," Springer Science & Business Media, 2012, 279 pages.

(56) References Cited

OTHER PUBLICATIONS

Schnell et al., "A novel error-tolerant anonymous linking code," German Record Linkage Center, Working Paper Series No. WP-GRLC-2011-02, Nov. 16, 2011, 14 pages.

Ion et al., "On Deploying Secure Computing Commercially: Private Intersection-Sum Protocols and their Business Applications," in IACR Cryptology ePrint Archive, 2019, 48 pages.

Chen et al., "Xgboost: A scalable tree boosting system," Proceedings of the 22nd kdd international conference on knowledge discovery and data mining. Aug. 13-17, 2016, 10 pages.

Li et al., "Federated Learning: Challenges, Methods, and Future Directions," arXiv:1908.07873v1 [cs.LG], Aug. 21, 2019, 21 pages.

Geyer et al., "Differentially Private Federated Learning: A Client Level Perspective," arXiv:1712.07557v1 [cs.CR], Dec. 20, 2017, 10 pages.

Bagdasaryan et al., "How To Backdoor Federated Learning," arXiv:1807.00459v3 [cs.CR], Aug. 6, 2019, 15 pages.

Bonawitz et al., "Towards Federated Learning at Scale: System Design," arXiv:1902.01046v2 [cs.LG], Mar. 22, 2019, 15 pages.

Zhao et al., "Federated Learning with Non-IID Data," arXiv:1806.00582v1 [cs.LG], Jun. 2, 2018, 13 pages.

Smith et al., "Federated multi-task learning," arXiv:1705.10467v2 [cs.LG], Feb. 27, 2018, 19 pages.

Corinzia et al., "Variational Federated Multi-Task Learning," arXiv:1906.06268v1 [cs.LG], Jun. 14, 2019, 10 pages.

Huang et al., "Faster Secure Two-Party Computation Using Garbled Circuits," in USENIX Security Symposium, vol. 201, No. 1, 2011, 16 pages.

Wang et al., "Global-Scale Secure Multiparty Computation," in Proceedings of the 2017 ACM SIGSAC Conference an Computer and Communications Security, Oct. 2017, 35 pages.

Wang et al., "Authenticated Garbling and Efficient Maliciously Secure Two-Party Computation," in Proceedings of the 2017 ACM SIGSAC Conference on Computerand Communications Security, 2017, 17 pages.

Chase et al., "Reusable Non-lnteractive Secure Computation," Crypto 2019: Advances in Cryptology, 2019, 54 pages.

Lopez-Alt et al., "On-the-Fly Multiparty Computation on the Cloud via Multikey Fully Homomorphic Encryption," STOC '12 Proceedings of the forty-fourth annual ACM symposium on Theory of computing, May 19-22, 2012, 73 pages.

Damgard et al., "Multiparty Computation from Somewhat Homomorphic Encryption," in Annual Cryptology Conference, Springer, 2012, 46 pages.

Baum et al., "Better Preprocessing for Secure Multiparty Computation," in International Conference on Applied Cryptography and Network Security, Springer, 2016, 19 pages.

Keller et al., "Overdrive: making spdz great again," in Annual International Conference on the Theory and Applications of Cryptographic Techniques Springer, 2018, 38 pages.

Nasr et al., "Machine Learning with Membership Privacy using Adversarial Regularization," arXiv:1807.05852v1 [stat.ML], Jul. 16, 2018, 14 pages.

* cited by examiner

Algorithm 1: *UE-VFL* Framework 1. initialize cryptosystems and deliver public keys;
2. process privacy-preserving entity resolution;
3. $w \leftarrow$ random initialization;
4. establish training hyperparameters with TPA and participants;
5. repeat
6.     foreach *mini-batch* $S \in \mathcal{D}$ do
7.         $\nabla E_\mathcal{D}(w) \leftarrow$ secure SGD computation;
8.         $w \leftarrow w - \alpha \nabla E_\mathcal{D}(w)$
9.     end
10.     $E_\mathcal{D}(w) \leftarrow$ secure loss computation;
11.     if $E_\mathcal{D}(w)$ *keep stable for a while* then break;
12. until *research max iterations*;
13. return $w$

---

Algorithm 2: Secure SGD/Loss (*2Phase-NSA* Approach)

Input: current model weights $w$; complete feature space $\mathcal{F}^d$; participants $\mathcal{P}$, where each participant $p_i$ has assigned training hyperparameter $\pi_{p_i}$, dataset $\mathcal{D}_{p_i}$ and public key $pk_{p_i}$ 1. function *coordinator-aggregate*($w, \mathcal{P}, \mathcal{F}^d$)
2.     foreach $p_i \in \mathcal{P}$ do
3.         query $p_i$ with $msg_{q,p_i} = (w_{p_i}, \pi_{p_i})$;
4.     end
5.     do
6.         $S_{msg_r} \leftarrow$ collect participants' response $msg_{r,p_i}$;
7.     while $\mathcal{F}$ in $S_{msg_r} \to \mathcal{F}^d$ and still in max waiting time;
8.     specify $w_{\mathcal{P}'}$ according to $S_{msg_r}$;
9.     foreach $msg_{r,p_i} \in S_{msg_r}$ do
10.         $u_{p_i} \leftarrow$ *Type1 NSA* on $msg_{r,p_i}.c_{fd}$ with $w_{\mathcal{P}'}$;
11.     end
12.     $\nabla E_\mathcal{D}(w) \leftarrow$ *Type2 NSA* on $msg_{r,p_i}.c_{sd}$ with $u$;
13. function *participant-process*($\mathcal{D}_{p_i}, pk_{p_i}, msg_{q,p_i}$)
14.     $\mathcal{D}'_{p_i} \leftarrow$ adjust $\mathcal{D}_{p_i}$ according to $\pi_{p_i}$;
15.     $c_{fd} \leftarrow$ execute *Type1 NSA* on $\mathcal{D}'_{p_i}$ in feature dimension;
16.     $c_{sd} \leftarrow$ execute *Type2 NSA* on $\mathcal{D}'_{p_i}$ in sample dimension;
17.     $msg_{r,p_i} \leftarrow (c_{fd}, c_{sd})$;
18.     sends $msg_{r,p_i}$ to the coordinator;

FIG. 9

```
Algorithm 3: Inference Prevention Module
   Input: function private key request query q_{k_x}; batch size
          n_b; total number of the features n_f
 1 initialize a new session with c_{Type1} ← 0, c_{Type2} ← 0;
 2 function IPM(q_{k_x})
 3 |   if exploited-vector-filter(q_{k_x}) then
 4 |   |   if key-request-count-filter(q_{k_x}) then
 5 |   |   |   forward q_{k_x}.v to the TPA;
 6 |   |   end
 7 |   end
 8 function exploited-vector-filter
 9 |   c_{nz} ← count the non-zero element in q_{k_x}.v;
10 |   if c_{nz} < t then return "exploited vector";
11 function key-request-count-filter(q_{k_x})
12 |   if q_{k_x}.type is Type1 then c_{Type1} ← c_{Type1} + 1;
13 |   if q_{k_x}.type is Type2 then c_{Type2} ← c_{Type2} + 1;
14 |   if max($\frac{c_{Type1}}{n_b}, \frac{c_{Type2}}{n_f}$) ≥ min(n_b, n_f) then
15 |   |   return "invalid query times"
16 |   end
```

FIG. 10

EFFICIENT PRIVATE VERTICAL FEDERATED LEARNING

BACKGROUND

The subject disclosure relates to vertical federated learning, and more specifically to universal and efficient privacy-preserving techniques to facilitate vertical federated learning. The parameters, weights, and/or biases of a machine learning model are generally optimized through training (e.g., supervised learning) on a known dataset. Federated learning involves collaboratively training a global machine learning model on multiple, distributed data sources that are maintained and/or owned by separate participants, rather than training the model on a single, central data source maintained and/or owned by a single participant. Such collaborative training is usually implemented by a coordinator/aggregator that oversees the participants, and can result in more robust and accurate machine learning models than any single participant could hope to train in isolation. However, the participants are often unwilling (e.g., limited trust), unable (e.g., limited connectivity or communication resources), and/or legally prohibited (e.g., privacy laws) from openly sharing all or part of their individual data sources with each other. Thus, systems/techniques that can facilitate federated learning while simultaneously preserving the privacy of each participant's individual data are advantageous.

There are two types of federated learning: horizontal federated learning and vertical federated learning. Horizontal federated learning involves collaborative training on horizontally partitioned datasets (e.g., the participants' datasets have common, similar, and/or overlapping feature spaces and uncommon, dissimilar, and/or non-overlapping sample spaces). For instance, two competing banks might have different clients (e.g., different sample spaces) while having similar types of information about their clients, such as age, occupation, credit score, and so on (e.g., similar feature spaces). Vertical federated learning, on the other hand, involves collaborative training on vertically partitioned datasets (e.g., the participants' datasets have common, similar, and/or overlapping sample spaces and uncommon, dissimilar, and/or non-overlapping feature spaces). For instance, a bank and an online retailer might serve the same clients (e.g., similar sample spaces) while having different types of information about those clients (e.g., different feature spaces).

Although many existing systems/techniques address privacy preservation in horizontal federated learning (which are inapplicable to vertically partitioned datasets), very few systems/techniques address privacy-preservation in vertical federated learning. Those few existing systems/techniques that do address vertical federated learning suffer from many shortcomings, including inefficient computation due to the implementation of additive homomorphic encryption (e.g., Paillier-based crypto system) and inefficient communication caused by the implementation of garbled-circuit-based secure multi-party computation. Moreover, such existing systems/techniques require two-way and/or multiple iterations of communication between the participants and the coordinator to facilitate a single training iteration. Additionally, such existing systems/techniques exhibit excessive communication overhead, and thus cannot be extended and/or are very difficult/cumbersome to extend to more than two participants. Furthermore, such existing systems/techniques require communication between the participants, which exposes each participant's dataset to the risk of inference attacks launched by other participants (e.g., curious and/or malicious) in the vertical federated learning framework, and cannot handle dynamic participant groups (e.g., addition and/or dropout of participants during the training process). Further still, such existing systems/techniques are model-specific (e.g., designed to work only with logistic regression models, designed to work only with XGBoost, and so on). Thus, there is a need for an improved, universal, and efficient privacy-preserving system/technique for facilitating vertical federated learning.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate universal and efficient privacy-preserving vertical federated learning are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a key distribution component that can distribute functional encryption public keys to respective participants in a vertical federated learning framework governed by a coordinator. In various embodiments, the computer-executable components can comprise an inference prevention component that can verify query vectors generated by the coordinator, and based on which the key distribution component can distribute functional encryption secret keys to the coordinator. In various aspects, the key distribution component can distribute respective feature-dimension public keys and respective sample-dimension public keys to the respective participants. In various aspects, the respective participants can send to the coordinator respective local model updates encrypted by the respective feature-dimension public keys. In various aspects, the respective participants can send to the coordinator respective local datasets encrypted by the respective sample-dimension public keys. In various embodiments, the inference prevention component can verify a participant-related weight vector generated by the coordinator. In various aspects, based on this verification, the key distribution component can distribute to the coordinator a functional feature-dimension secret key that can aggregate the encrypted respective local model updates into a sample-related weight vector. In various embodiments, the inference prevention component can verify the sample-related weight vector. In various aspects, based on this verification, the key distribution component can distribute to the coordinator a functional sample-dimension secret key that can aggregate the encrypted respective local datasets into an update value for a global model.

According to one or more embodiments, the above-described system can be implemented as a computer-implemented method.

According to one or more embodiments, the above-described system can be implemented as a computer program product for facilitating universal and efficient privacy-preserving vertical federated learning. The computer program product can comprise a computer readable storage medium having program instructions embodied therewith. The program instructions can be executable by a processing component, which can cause the processing component to perform various acts.

One or more embodiments of the subject claimed innovation can solve problems plaguing the prior art. As mentioned above, most federated learning systems address only horizontally partitioned datasets, not vertically partitioned datasets. Moreover, those few existing systems/techniques that address vertical federated learning rely on computationally inefficient additive homomorphic encryption and garbled-circuit techniques, are model-specific, can easily support no more than two participants, require two-way and/or multiple iterations of participant-coordinator communication in each training iteration, require inter-participant communication, and cannot handle dynamic participant groups. Such characteristics make existing systems/techniques slow, inefficient, and vulnerable to inference attacks by curious/malicious participants and/or a curious/malicious coordinator.

Various embodiments of the subject claimed innovation can solve these problems by implementing a two-phase non-interactive secure aggregation approach that leverages hybrid functional encryption techniques. Functional encryption, which can be more computationally efficient than homomorphic encryption, can involve a public key that encrypts confidential data and a functional secret key that, when applied to the encrypted confidential data, yields a functional output based on the confidential data without decrypting/revealing the confidential data (e.g., generating a functional output based on a ciphertext of data x without learning the corresponding plaintext of data x). Single-input functional encryption (SIFE) techniques can be used to generate the public key and functional secret key when the ciphertext comes from one source. Multi-input functional encryption (MIFE) techniques can be used to generate the public keys and functional secret key when the ciphertext comes from more than one source. In various embodiments, the subject claimed innovation can generate and distribute MIFE public keys and SIFE public keys to each participant in a vertical federated learning framework. Each participant can use its MIFE public key to encrypt partial model updates that it computes locally during a training iteration of the vertical federated learning framework. Moreover, each participant can use its SIFE public key to encrypt its local dataset. The participants can send these encrypted local model updates and encrypted local datasets to the coordinator. The coordinator can generate a participant-related weight vector (e.g., which can correspond to the weighted contribution of each participant in the collaborative training) and can request a functional secret key based on the participant-related weight vector. The subject claimed innovation can verify the participant-related weight vector (e.g., by counting a number of non-zero elements, by counting a number of requests by the coordinator and/or training epochs, and so on). Based on the verification, the subject claimed innovation can generate and distribute an MIFE functional secret key to the coordinator (e.g., a functional secret key that outputs an inner product between an input ciphertext vector and the participant-related weight vector). The coordinator can apply the MIFE functional secret key to the set of encrypted local model updates, which results can be aggregated into a sample-related weight vector. In similar fashion, the coordinator can request a functional secret key based on the sample-related weight vector, and the subject claimed innovation can verify the sample-related weight vector. Based on the verification, the subject claimed innovation can generate and distribute an SIFE functional secret key to the coordinator (e.g., a functional secret key that outputs an inner product between an input ciphertext vector and the sample-related weight vector). The coordinator can apply the SIFE functional secret key to the set of encrypted local datasets, which can result in an overall update value for a global machine learning model (e.g., a stochastic gradient descent update value for the model being collaboratively trained by the vertical federated learning framework).

Note that functional encryption techniques can be far more computationally efficient than homomorphic encryption techniques. This can result in much faster federated learning than existing systems/techniques can facilitate (e.g., mere seconds to train via hybrid functional encryption versus hours to train via homomorphic encryption). Moreover, note that the overall update value can be generated using a one-way communication from each participant to the coordinator (e.g., each participant sends its encrypted local model updates and its encrypted local datasets to the coordinator, no other participant-coordinator communication during the training phase is required) and without any communication occurring between participants (e.g., the participants need not send any encrypted or decrypted information to each other). This can greatly reduce vulnerability to inference attacks from other participants. Furthermore, note that the coordinator cannot obtain the overall update value without first passing a two-layer verification process (e.g., verifying both the participant-related weight vector and the sample-related weight vector). This can greatly reduce vulnerability to inference attacks from the coordinator. Further still, note that the underlying type of machine learning model can be immaterial to the encryption/decryption process (e.g., gradient descent updates for any suitable type of machine learning model can be securely communicated using embodiments of the subject claimed innovation). This can allow embodiments of the subject claimed innovation to apply universally, unlike existing systems/techniques which are compatible only with particular machine learning paradigms. Overall, various embodiments of the subject claimed innovation can constitute notable improvements in the field of vertical federated learning.

DESCRIPTION OF THE DRAWINGS

FIGS. 9-10 illustrate high-level diagrams of example, non-limiting algorithms that facilitate universal and efficient privacy-preserving vertical federated learning in accordance with one or more embodiments described herein.

DETAILED DESCRIPTION

Figure 1:
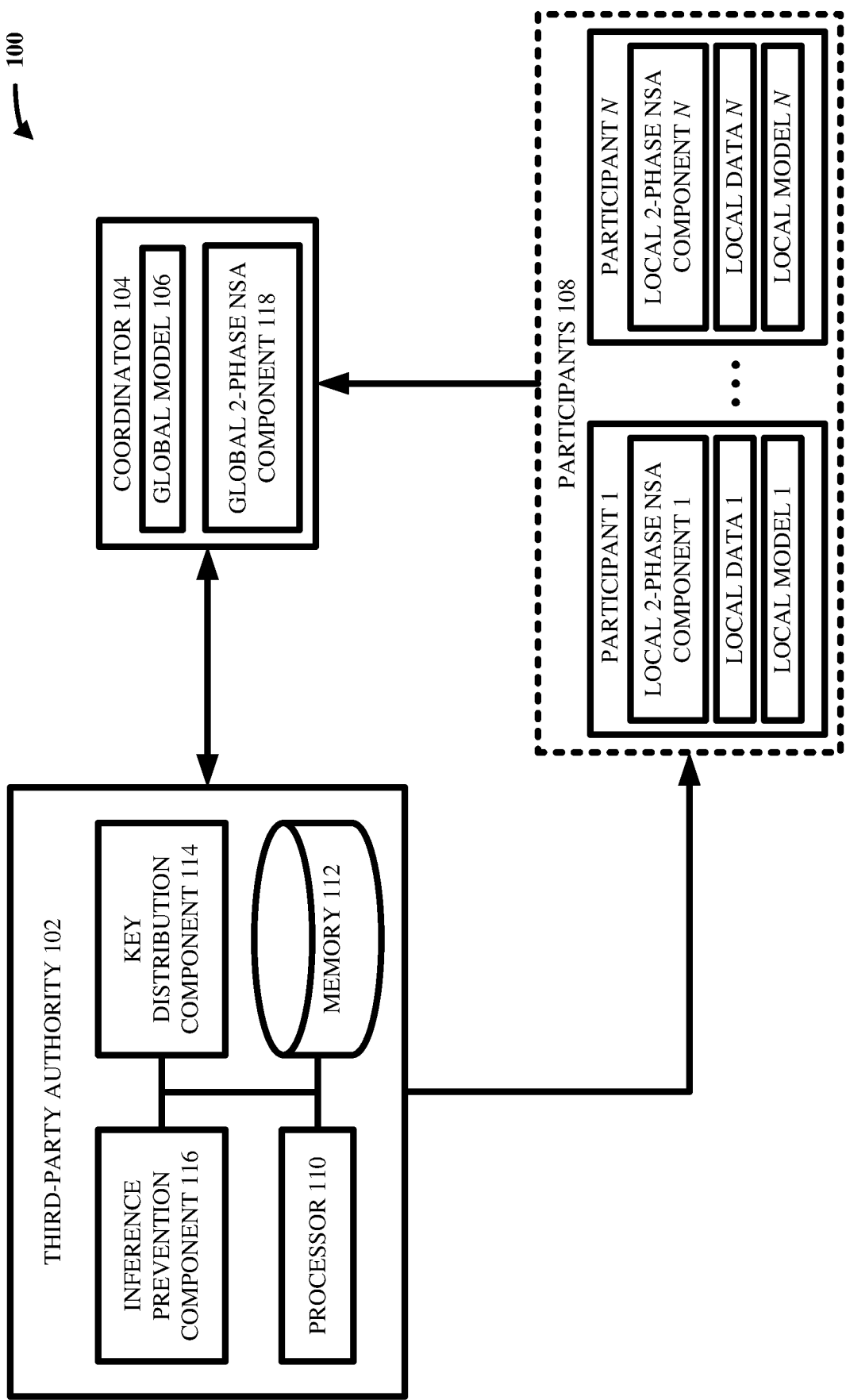
FIG. 1 illustrates a block diagram of an example, non-limiting system that facilitates universal and efficient privacy-preserving vertical federated learning in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Machine learning systems are becoming ubiquitous (e.g., recommendation systems, diagnostic/prediction systems, autopilot systems, pattern recognition systems, and so on), and their performance (e.g., optimization of parameters, weights, biases, and so on) can rely on large volumes of training data. Often, such training data is dispersed, distributed, and/or maintained by various entities/participants, rather than being stored/maintained by one central entity/participant. In various cases, those participants can be unwilling (e.g., limited trust scenarios, such as among competing businesses), unable (e.g., limited connectivity/resource scenarios, such as with outer space operations), or legally prohibited (e.g., privacy laws, such as HIPAA, GDPR, CCPA, and so on) from openly sharing all or part of their local datasets with each other. However, collaboratively training a machine learning model on such distributed data (e.g., called federated learning) can result in a more accurate and/or robust model than any participant could train in isolation. Thus, there is a need for systems/techniques that facilitate privacy-preserving federated learning.

As mentioned above, although several systems/techniques exist to facilitate privacy-preserving horizontal federated learning (e.g., where each participant has a full feature space and an incomplete sample space, and where aggregation occurs on the partial model update), very few systems/techniques exist for privacy-preserving vertical federated learning (e.g., where each participant has only a subset of the feature space for each sample in the collaborative training data, and where aggregation occurs on the complete model update). Those few systems/techniques that do exist are model-specific, rely on computationally expensive homomorphic encryption and/or garbled circuit techniques (e.g., secure linear regression, private logistic regression, secure boost, and so on), require two-way and/or multiple iterations of participant-coordinator communication, require extensive inter-participant communication (e.g., participants exchange intermediate results with each other, participants reveal class distribution over given attributes to each other, and so on), cannot be readily scaled to handle more than two participants, and/or cannot handle dynamic/changing numbers of participants between training iterations.

Embodiments of the subject claimed innovation can solve these problems in the prior art. Various embodiments described herein propose a universal privacy-preserving synchronous vertical federated learning framework for collaboratively training a global machine learning model over a global dataset vertically composed of subsets of features owned by each participant. Such framework can include two-phase non-interactive secure aggregation (2-Phase NSA) protocols facilitated by hybrid functional encryption (FE) schemes as the underlying cryptosystem infrastructure. In various cases, the 2-Phase NSA protocols do not require communication among the participants, and the communication between each participant and the coordinator can be a one-way interaction (e.g., aside from facilitating entity resolution and initiating training iterations, the coordinator need not send any encrypted or intermediate values to the participants during training). In various aspects, the proposed 2-Phase NSA protocols can be implemented with any suitable linear and/or non-linear machine learning model (e.g., embodiments of the subject claimed innovation are not limited to training only a particular machine learning paradigm). In various aspects, the proposed 2-Phase NSA protocols can robustly handle dynamic groups of participants (e.g., addition and/or dropout of a predetermined number of participants during the learning phase). As explained in more detail below, theoretical and experimental results indicate that embodiments of the 2-Phase NSA protocols of the subject claimed innovation can exhibit efficiency improvements both in training time and communication cost while exhibiting comparable and/or better privacy protection and model accuracy as compared to existing vertical federated learning techniques.

Embodiments described herein include systems, computer-implemented methods, apparatus, and/or computer program products that facilitate universal and efficient privacy-preserving vertical federated learning. In various embodiments, a key distribution component can leverage hybrid functional encryption techniques to generate and distribute feature-dimension public keys (e.g., public keys generated via MIFE) and sample-dimension public keys (e.g., public keys generated via SIFE) to each participant in a vertical federated learning framework governed by a coordinator (e.g., an aggregator). Each participant can locally compute partial model updates based on its local/partial dataset during a training iteration, and can encrypt those local model updates using its feature-dimension public key. Each participant can also encrypt its local dataset using its sample-dimension public key. Each participant can send its encrypted local model updates and encrypted local dataset to the coordinator (e.g., one-way communication). In various embodiments, this can be the only instance of participant-coordinator communication during the training phase (e.g., aside from entity resolution and training initiation). Moreover, note that no communication and/or exchange of information between the participants is required. In various instances, the coordinator can generate a participant-related weight vector (e.g., corresponding to the weighted contribution of each participant during the training), and an inference prevention component can verify the participant-related weight vector, as explained in more detail below. Based on this verification, the key distribution component can generate and distribute a functional feature-dimension secret key based on the participant-related weight vector (e.g., MIFE secret key yielding the inner product between input ciphertext and the participant-related weight vector) to the coordinator. The coordinator can apply the functional feature-dimension secret key to the encrypted local model updates for each participant and/or for each sample in the sample space and can aggregate the results into a sample-related weight vector, which the inference prevention component can verify. Based on this verification, the key distribution component can generate and distribute a functional sample-dimension secret key based on the sample-related weight vector (e.g., SIFE secret key yielding the inner product between input ciphertext and the sample-related weight vector) to the coordinator. The coordinator can apply the functional sample-dimension secret key to the encrypted local datasets, which can result in an overall update value for the global model being trained by the vertical federated learning framework.

Various embodiments of the subject claimed innovation can be employed to use hardware and/or software to solve problems that are highly technical in nature (e.g., to facilitate universal and efficient privacy-preserving vertical federated learning), that are not abstract and that cannot be performed as a set of mental acts by a human. Further, some of the processes performed can be performed by a specialized computer (e.g., public key generator and distributor, functional secret key generator and distributor, inference prevention module, and so on) for carrying out defined tasks related to universal and efficient privacy-preserving vertical federated learning (e.g., generation and distribution of MIFE and SIFE public keys to participants, verification of input weight vectors generated by the coordinator, generation and distribution of MIFE and SIFE functional secret keys to the coordinator, and so on). In various embodiments, the subject claimed innovation can be employed to implement hybrid functional encryption techniques into a practical application that can provide technical improvements to and solve problems that arise in the field of universal and efficient privacy-preserving vertical federated learning. By using hybrid functional encryption techniques rather than homomorphic encryption techniques, and by implementing a two-level verification process, embodiments of the subject claimed innovation can provide robust and secure vertical federated learning in less time and by using fewer computing resources that conventional techniques, do not require two-way communication between each participant and the coordinator, do not require any communication between participants, and do not require a static number of participants during training. Such embodiments thus constitute a concrete and tangible technical improvement in the prior art.

FIG. 1 illustrates a block diagram of an example, non-limiting system 100 that can facilitate universal and efficient privacy-preserving vertical federated learning in accordance with one or more embodiments described herein. As shown, a third-party authority 102 (TPA 102), that can in various instances facilitate two-phase non-interactive secure aggregation, can work in conjunction with a coordinator 104 and a group of participants 108 in order to collaboratively train a global model 106. In various embodiments, the global model 106 can be any suitable linear and/or non-linear machine learning model (e.g., logistic regression, XGBoost, neural network, support vector machine, tree ensemble, and so on). As shown, the group of participants 108 can include n participants (e.g., participant 1, . . . , participant n, and so on), for any suitable positive integer n. In various cases, each of the participants 108 can comprise, manage, maintain, and/or otherwise oversee its own local dataset and its own local model (e.g., local data 1 and local model 1 maintained by participant 1, . . . , local data n and local model n maintained by participant n, and so on).

In various embodiments, the TPA 102, the coordinator 104, and the participants 108 can form a vertical federated learning framework, where the global model 106 is trained on the collective dataset (e.g., and/or an entity-resolved portion of the collective dataset) of the participants 108. In various aspects, the coordinator 104, which can also be called an aggregator, can help to coordinate entity matching/resolution of the local datasets of the participants 108 and can aggregate the global model 106 during federated training. In various instances, the collective dataset of the participants 108 can be vertically partitioned (e.g., each participant can have a subset of the feature space for each sample in the sample space). In various aspects, one of the participants 108 (e.g., called the active participant) can have in its local dataset a class label (e.g., the feature that the global model 106 is being trained to recognize/classify), while the local datasets of the remaining participants 108 (e.g., called passive participants) can lack the class label. In various embodiments, the TPA 102 can be considered as a trusted third-party authority (TPA) that can establish the underlying cryptosystem, generate and deliver public keys to the participants 108, and generate and deliver functional secret keys to the coordinator 104. In various embodiments, the coordinator 104 can be replaced by the active participant.

In various embodiments, the vertical federated learning framework can train the global model 106 based on a gradient descent approach. In various cases, gradient descent is an iterative optimization algorithm to find the minimum of a target function by iteratively moving in the direction of steepest descent as defined by the negative of the gradient. In the machine learning context, gradient descent and its variants, such as stochastic gradient descent (SGD) and/or mini-batch stochastic gradient descent, can be used to optimize machine learning parameters, weights, coefficients, and/or biases. Formally, suppose that a machine learning model can be fitted to a prediction function denoted as $f(x; w)$ wherein x is the sample and w is the trained parameters. Then, the regularized training error $E_D(w)$ can be defined as follows:

$$E_D(w) = \frac{1}{n}\sum_{i=1}^{n} L(y^{(i)}, f(x^{(i)}; w)) + \beta R(w),$$

where L is the loss function for each sample i, y is the class label for sample i, and R is a regularization term. The training/model fitting problem is to find proper model parameters w to achieve minimum loss over the training dataset D with specified L and R, which can be formalized as follows:

$$\operatorname{argmin}_w E_D(w) = \operatorname{argmin}_w \frac{1}{n}\sum_{i=1}^{n} L(y^{(i)}, f(x^{(i)}; w)) + \beta R(w).$$

Then, the gradient descent optimization algorithm can be represented as iteratively applying the model parameter update rule until a convergence condition (e.g., maximum number of iterations, maximum training time, minimum parameter change, and so on) is satisfied. In various embodiments, this can be represented as follows:

$$w \leftarrow w - \alpha \nabla E_D(w),$$

where $\alpha$ is the learning rate and $\nabla E_D(w)$ is the gradient in the current iteration.

In various aspects, different assumptions/considerations about the behavior of various components can be made to help analyze the privacy guarantees of embodiments of the subject claimed innovation. For example, the coordinator 104 can be considered as honest-but-curious, meaning that the coordinator 104 can correctly follow algorithm/protocol instructions but can try to learn/infer confidential information from aggregated updates of the global model 106. In various aspects, the participants 108 can be considered as curious-and-colluding, meaning that the participants 108 can collude to try to obtain confidential information from other participants by inspecting messages exchanged with the coordinator 104. In various aspects, the active participant can be assumed to not collude with the passive participants. In various instances, the TPA 102 (e.g., the third-party authority) can be considered as trusted by the participants 108 and the coordinator 104 (e.g., an independent third-party that is widely trusted, and so on). In various cases, the TPA 102 can be in charge of holding the master private and public keys, and can be trusted to perform public key distribution and secret key generation. Moreover, secure communication channels between the TPA 102, the coordinator 104, and the participants 108 can be assumed (e.g., snooping, denial of service, and malicious update attacks are not addressed by the present disclosure).

Such considerations/assumptions are common in the federated learning literature. In various embodiments, the TPA 102 can facilitate successful vertical federated learning of the global model 106 while simultaneously guaranteeing that, under the above considerations/assumptions, the coordinator 104 and the participants 108 cannot successfully launch inference attacks to learn the local datasets of honest participants. After all, embodiments of the subject claimed innovation involve one-way communication between each of the participants 108 and the coordinator 104 and do not require inter-participant communication (e.g., because no participant receives sensitive data from the coordinator 104 or from any other participant, no participant can successfully launch an inference attack). Similarly, embodiments of the subject claimed innovation involve double verification to ferret out coordinator inference attacks.

In various embodiments, the TPA 102 can comprise a processor 110 (e.g., computer processing unit, microprocessor, and so on) and a computer-readable memory 112 that is operably connected to the processor 110. The memory 112 can store computer-executable instructions which, upon execution by the processor 110, can cause the processor 110 and/or other components of the TPA 102 (e.g., key distribution component 114, inference prevention component 116, and so on) to perform one or more acts. In various embodiments, the memory 112 can store computer-executable components (e.g., key distribution component 114, inference prevention component 116, and so on), and the processor 110 can execute the computer-executable components. In various embodiments, each of the participants 108 and/or the coordinator 104 can comprise similar processors and/or computer-readable memories.

In various embodiments, the TPA 102 can comprise a key distribution component 114. In various aspects, the key distribution component 114 can generate and/or distribute public keys to the participants 108 and/or functional secret keys to the coordinator 104 using two types of non-interactive secure aggregation protocols: a type-1 NSA protocol, and a type-2 NSA protocol. In various instances, encryption actions involved in the type-1 and type-2 NSA protocols can be facilitated by each of the participants 108 via participant-side 2-Phase NSA components (e.g., local 2-Phase NSA component 1 of participant 1, . . . , local 2-Phase NSA component n of participant n, and so on). In various instances, decryption actions involved in the type-1 and type-2 NSA protocols can be facilitated by the coordinator 104 via a coordinator-side 2-Phase NSA component (e.g., global 2-Phase NSA component 118). In various aspects, a type-1 NSA protocol can securely aggregate the sum of a group of vectors that belong to different participants (e.g., using MIFE for inner products). In various aspects, a type-2 NSA protocol can securely aggregate the sum of one vector that is owned by one participant (e.g., using SIFE for inner products). In either protocol, the communication between the participants 108 and the coordinator 104 can be a one-way interaction facilitated by functional encryption (FE) techniques, rather than homomorphic encryption (HE) techniques. Although both FE and HE can compute a specific function over ciphertext to generate a function result, HE outputs are still in ciphertext (which can greatly reduce computation efficiency) while FE outputs can be in plaintext (which can greatly increase computation efficiency).

FE techniques belong to a public-key encryption family where the decryptor can be issued a secret key (e.g., a functionally derived key) that allows the decryptor to learn the result of a function over a ciphertext without learning the corresponding plaintext. That is:

$$D_{sk}(E_{pk}(x)) = f(x),$$

without revealing x, where $D_{sk}$ represents decryption by the functional secret key, $E_{pk}$ represents encryption by the public key, and $f$ represents the desired output function.

In various embodiments, functional encryption for inner-product (FEIP) schemes can be implemented, which can output the inner-product between ciphertext of one or more input vectors and some other given, desired, and/or predetermined vector without revealing the plaintext of the one or more input vectors (e.g., $f$ above can be an inner-product function). In various aspects, both single-input functional encryption (SIFE) and multi-input functional encryption (MIFE) techniques can be used to generate inner-product outputs. In SIFE, the output function $f_{SIFE}$ can be described as:

$$f_{SIFE}(x \cdot y) = \langle x, y \rangle = \sum_{i=1}^{\eta}(x_i y_i),$$

where x and y are two vectors of length $\eta$. In MIFE, the output function $f_{MIFE}$ can be:

$$f_{MIFE}((x_1, x_2, \ldots, x_n), y) = \sum_{i=1}^{n}\sum_{j=1}^{\eta_i}\left(x_{ij} y_{j+\Sigma_{k=1}^{i-1}\eta_k}\right),$$

where $x_i$ and y are vectors, where n is the number of vectors in the vector set $\{x_i\}$, where $\eta_i$ is the length of the i-th vector in the vector set $\{x_i\}$, where each vector of the vector set $\{x_i\}$ can come from a different participant/source, and where the total length of the vector set $\{x_i\}$ is equal to the length of y.

In various embodiments, the key distribution component 114 can generate a master public key and secret key pair (mpk, msk) based on given security parameters and/or functional parameters (e.g., maximum number of input parties, maximum input vector length, and so on). In various aspects, the key distribution component 114 can deliver a common public key or party-specific public key to the participants 108, based on the given master public/secret keys. In various aspects, the key distribution component 114 can take as input the master public/secret keys and a vector y generated by the coordinator 104 (e.g., participant-related weight vector $w_p$, sample-related weight vector u, and so on), and can generate as output an MIFE and/or SIFE function derived key that computes an inner-product between input ciphertext and the vector y generated by the coordinator 104. The coordinator 104 can accordingly apply the function derived key on data x or set of data $\{x_i\}$ received from the participants 108 to yield $f_{SIFE}(x. y)$ or $f_{MIFE}(\{x_i\}, y)$.

In various aspects, the key distribution component 114 can generate and/or distribute to each of the participants 108 an MIFE public key (e.g., called a feature-dimension public key) and an SIFE public key (e.g., called a sample-dimension public key). Each participant can independently encrypt their local/partial model updates via the MIFE public key (e.g., which can be facilitated by its local 2-Phase NSA component), and each can independently encrypt their local/partial dataset via the SIFE public key (e.g., which can be facilitated by its local 2-Phase NSA component). This encrypted information can be sent to the coordinator 104 (e.g., via one-way communication between each participant and the coordinator 104). In various aspects, based on this encrypted information, the coordinator 104 can request and apply corresponding functional secret keys to generate a global model update (e.g., via the global 2-Phase NSA component 118).

In various embodiments, the TPA 102 can comprise an inference prevention component 116. In various aspects, the inference prevention component 116 can help to prevent inference attacks by the coordinator 104. Specifically, in various aspects, the inference prevention component 116 can receive a request and a query vector (e.g., participant-related weight vector $w_p$, sample-related weight vector u) generated by the coordinator 104 (e.g., by the global 2-Phase NSA component 118) for a function derived secret key. In various instances, the inference prevention component 116 can verify the query vector (e.g., by counting non-zero elements, by counting number of requests and/or training epochs by the coordinator 104, and so on). If the vector is valid (e.g., successfully verified), the inference prevention component 116 can cause the key distribution component 114 to generate and distribute to the coordinator 104 the appropriate function derived secret key (e.g., MIFE-inner-product secret key for $w_p$ and/or SIFE-inner-product secret key for u). If the vector is invalid (e.g., not verified), the inference prevention component 116 can cause the key distribution component 114 to not generate and/or to withhold the appropriate function derived secret key.

In various embodiments, after receiving the encrypted local model updates and the encrypted local datasets from the participants 108, the coordinator 104 can, via the global 2-Phase NSA component 118, generate a participant-related weight vector $w_p$ that can represent a desired and/or predetermined weighted contribution of each participant's features/updates in the final global model 106. In some cases, $w_p$ can be a vector of ones having as many elements as there are participants in the framework, indicating that each of the participants 108 is equally weighted in the training. In some cases, any other suitable and/or desired vector $w_p$ can be used, can be established ahead of time, and/or can depend on operational context. If $w_p$ is verified by the inference prevention component 116, the key distribution component 114 can generate and distribute to the coordinator 104 a functional feature-dimension secret key $sk_{f,w_p}$ (e.g., an MIFE secret key) that can output the inner-product between $w_p$ and the set of encrypted local model updates for each sample in the sample space. If $w_p$ is not verified, the functional feature-dimension secret key can be withheld from the coordinator 104 and a warning can be sent to the participants 108.

In various aspects, the coordinator 104 can have leeway in defining/generating $w_p$, and can be considered as requesting an MIFE secret key that computes the inner product between a desired $w_p$ and input ciphertext. In various cases, the inference prevention component 116 can monitor the behavior of the coordinator 104 to ferret out inference attacks. For instance, if the inference prevention component 116 determines that $w_p$ is suspiciously constructed (e.g., too few non-zero elements), the request of the coordinator 104 can be denied.

In various instances, the coordinator 104 can be curious and thus can try to launch an inference attack by manipulating $w_p$ such that it has only one non-zero element. In such case, the inner-product of the encrypted local model updates with the manipulated vector $w_p$ would yield the plaintext of the local model update of the participant corresponding to the non-zero element, meaning that the coordinator 104 would have successfully inferred plaintext information of that participant. In various aspects, other types of manipulation of $w_p$ are possible. In various embodiments, the inference prevention component 116 can prevent such inference attacks (e.g., by verifying that a number of non-zero elements of $w_p$ is not below a predetermined threshold). In various cases, the coordinator 104 can be curious and thus can try to launch an inference attack by storing intermediate inner product results to construct a degree-1 set of multivariate polynomial equations and solving to infer the plaintext of the local model updates of each participant. In various embodiments, the inference prevention component 116 can prevent such inference attacks (e.g., by verifying that a count of training epochs is less than both a number of features per sample and a number of samples per training batch).

In various embodiments, if the key distribution component 114 distributes the functional feature-dimension secret key $sk_{f,w_p}$ to the coordinator 104, the coordinator 104 can, via the global 2-Phase NSA component 118, apply it to the encrypted local model updates of each participant and/or for each sample in the sample space (e.g., yielding for each sample and/or participant the inner product between the local model updates and $w_p$) and can aggregate the results into a sample-related weight vector u. The coordinator 104 can, via the global 2-Phase NSA component 118, send u to the inference prevention component 116 to request a functional sample-dimension secret key $sk_{f,u}$ (e.g., an SIFE secret key) that can output the inner-product between u and the set of encrypted local datasets, thereby yielding an overall update value (e.g., a stochastic gradient descent update value) for the global model 106. If u is not verified, the functional sample-dimension secret key can be withheld from the coordinator 104 and a warning can be sent to the participants 108. In various cases, the coordinator 104 can be curious and can try to launch inference attacks by manipulating u, similar to the inference attacks regarding $w_p$. In various aspects, the inference prevention component 116 can similarly prevent such attacks.

Figure 2A:
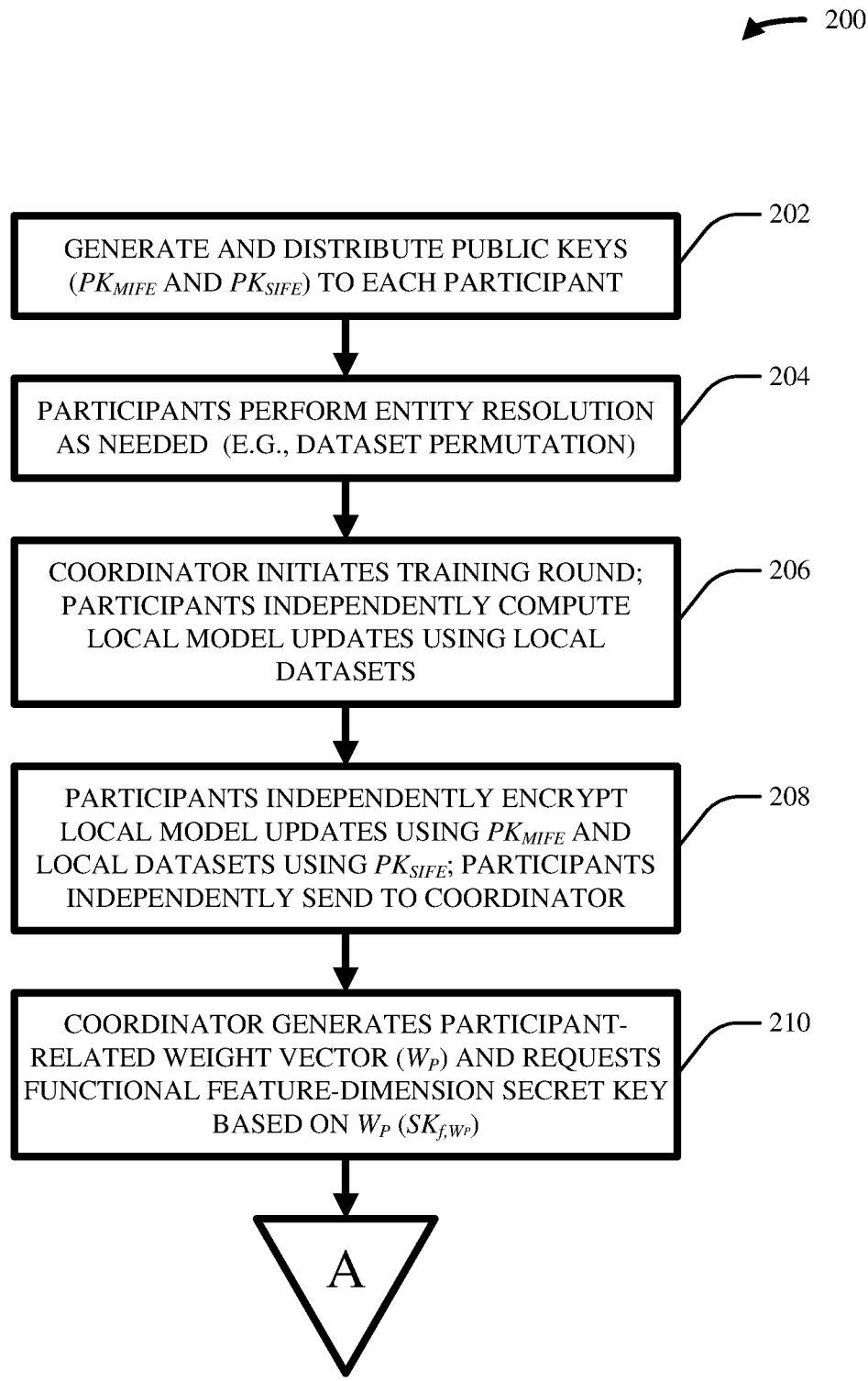
FIGS. 2A-B illustrate a high-level flow diagram of an example, non-limiting computer-implemented method that facilitates universal and efficient privacy-preserving vertical federated learning in accordance with one or more embodiments described herein.
Figure 2B:
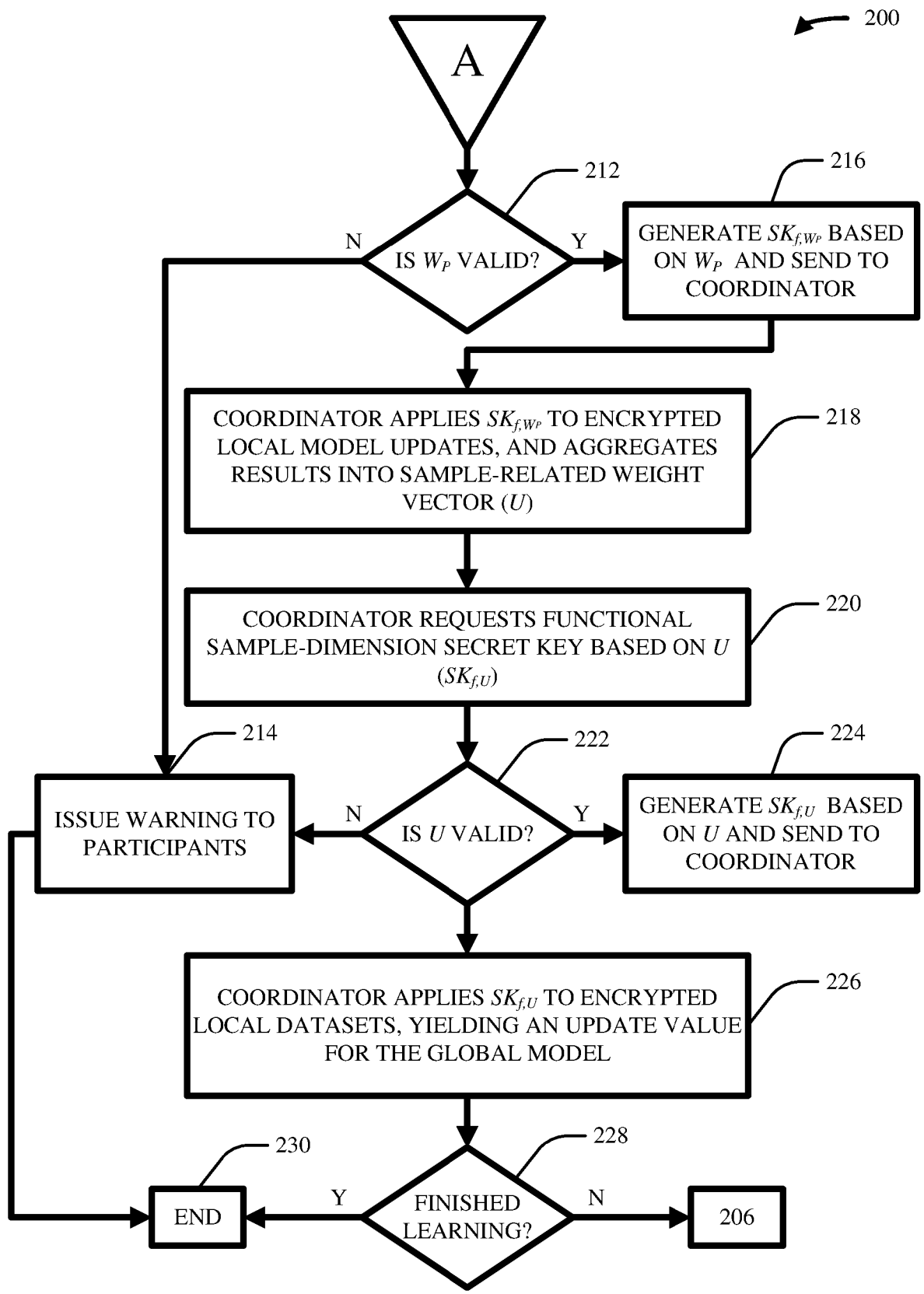

FIGS. 2A-B illustrate a high-level flow diagram of an example, non-limiting computer-implemented method 200 that can facilitate universal and efficient privacy-preserving vertical federated learning in accordance with one or more embodiments described herein. In various embodiments, the computer-implemented method 200 can be performed by the system 100.

In various embodiments, act 202 can include generating and distributing (e.g., by the key distribution component 114) public keys (e.g., $pk_{MIFE}$ and $pk_{SIFE}$) to each participant in a vertical federated learning framework governed by a coordinator (e.g., each of participants 108, governed by the coordinator 104). In various embodiments, feature-dimension public keys (e.g., $pk_{MIFE}$) can be unique to each participant, while sample-dimension public keys (e.g., $pk_{SIFE}$) can be the same/uniform across participants.

In various instances, act 204 can include the participants performing entity resolution/matching as needed (e.g., dataset permutation). In various aspects, this can be facilitated by any suitable privacy-preserving entity resolution technique (e.g., simple hash, hash and encryption, bloom filter encoding, and so on).

In various aspects, act 206 can include the coordinator initiating a training iteration, and the participants independently computing local model updates (e.g., $\eta_{pi}$ for each participant i) based on their local datasets (e.g., $X_{pi}$ for each participant i). In various aspects, the local model updates of the active participant can take into account the class label (e.g., difference between active participant's local model prediction and the true class label for each sample in the sample space).

In various cases, act 208 can include the participants independently encrypting (e.g., via their local 2-Phase NSA components) their local model updates using $pk_{MIFE}$ (e.g., $ct_{MIFE,pi}=E_{pk_{MIFE}}(\theta_{pi})$) and independently encrypting (e.g., via their local 2-Phase NSA components) their local datasets using $pk_{SIFE}$ (e.g., $ct_{SIFE,pi}=E_{pk_{SIFE}}(X_{pi})$). Each participant can independently send (e.g., via one-way communication) this encrypted information to the coordinator.

In various embodiments, act 210 can include the coordinator generating (e.g., via the global 2-Phase NSA component 118) a participant-related weight vector (e.g., $w_p$) and requesting a functional feature-dimension secret key (e.g., $sk_{f,w_p}$) based on $w_p$ (e.g., an MIFE secret key that outputs an inner-product between input ciphertext and $w_p$).

In various instances, act 212 can include determining (e.g., by the inference prevention component 116) whether $w_p$ is valid. If not, the computer-implemented method 200 can proceed to act 214. If so, the computer-implemented method 200 can proceed to act 216.

In various aspects, act 214 can include issuing a warning to the participants, and proceeding to end the computer-implemented method 200 at act 230.

In various cases, act 216 can include generating (e.g., by the key distribution component 114) $sk_{\eta,w_p}$ based on $w_p$ and sending to the coordinator.

In various embodiments, act 218 can include the coordinator applying (e.g., via the global 2-Phase NSA component 118) $sk_{f,w_p}$ to the set of encrypted local model updates and aggregating (e.g., via the global 2-Phase NSA component 118) the results into a sample-related weight vector u (e.g., $u=\{D_{sk_{f,w_p}}(\{ct_{MIFE}\})\}$; $\{u^{(i)}=D_{sk_{f,w_p}}(\{ct_{MIFE}^{(i)}\})\}$; and so on).

In various instances, act 220 can include the coordinator requesting (e.g., via the global 2-Phase NSA component 118) a functional sample-dimension secret key (e.g., $sk_{f,u}$) based on u (e.g., SIFE secret key that outputs an inner product between input ciphertext and u).

In various aspects, act 222 can include determining (e.g., by the inference prevention component 116) whether u is valid. If not, the computer-implemented method 200 can proceed to act 214. If so, the computer-implemented method 200 can proceed to act 224.

In various cases, act 224 can include generating (e.g., by the key distribution component 114) $sk_{f,u}$ based on u and sending to the coordinator.

In various embodiments, act 226 can include the coordinator applying (e.g., via the global 2-Phase NSA component 118) $sk_{f,u}$ to the encrypted local datasets, thereby yielding an update value for a global model (e.g., $\theta_{update}=D_{sk,f,u}(\{ct_{SIFE}\})$).

In various instances, act 228 can include determining whether federated learning has been completed. If so, the computer-implemented method 200 can proceed to act 230 (e.g., end). If not, the computer-implemented method 200 can proceed to act 206 (e.g., perform another training iteration).

Figure 3:
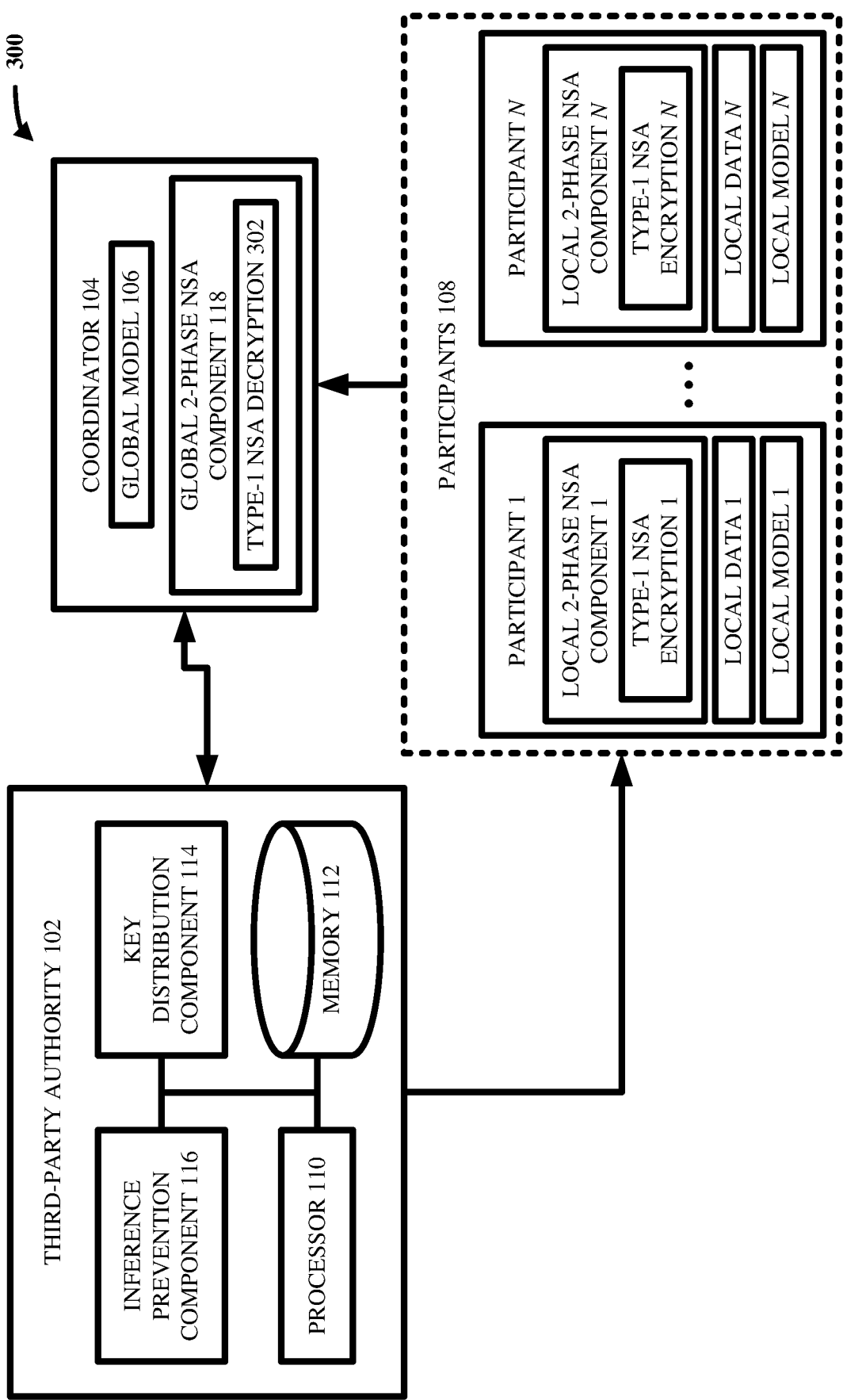
FIG. 3 illustrates a block diagram of an example, non-limiting system including type-1 NSA encryption and decryption that facilitates universal and efficient privacy-preserving vertical federated learning in accordance with one or more embodiments described herein.

FIG. 3 illustrates a block diagram of an example, non-limiting system 300 including type-1 NSA encryption and decryption that can facilitate universal and efficient privacy-preserving vertical federated learning in accordance with one or more embodiments described herein. As shown, the system 300 can, in various embodiments, include the same components as the system 100, and can further comprise type-1 NSA encryption in each of the participants 108 and type-1 NSA decryption 302 in the coordinator 104.

In various aspects, each of the participants 108 can employ type-1 NSA encryption to protect their local model updates (e.g., encrypting local model updates via MIFE public keys), and the coordinator 104 can employ type-1 NSA decryption 302 to securely aggregate the sum of the encrypted local model updates without learning the corresponding plaintext. In various instances, the type-1 NSA decryption 302 of the coordinator 104 can generate a participant-related weight vector $w_p$, can request a functional feature-dimension secret key $sk_{f,w_p}$ (e.g., MIFE for inner products) based on $w_p$, and can apply $sk_{f,w_p}$, after verification, to securely aggregate the encrypted local model updates.

Figure 4:
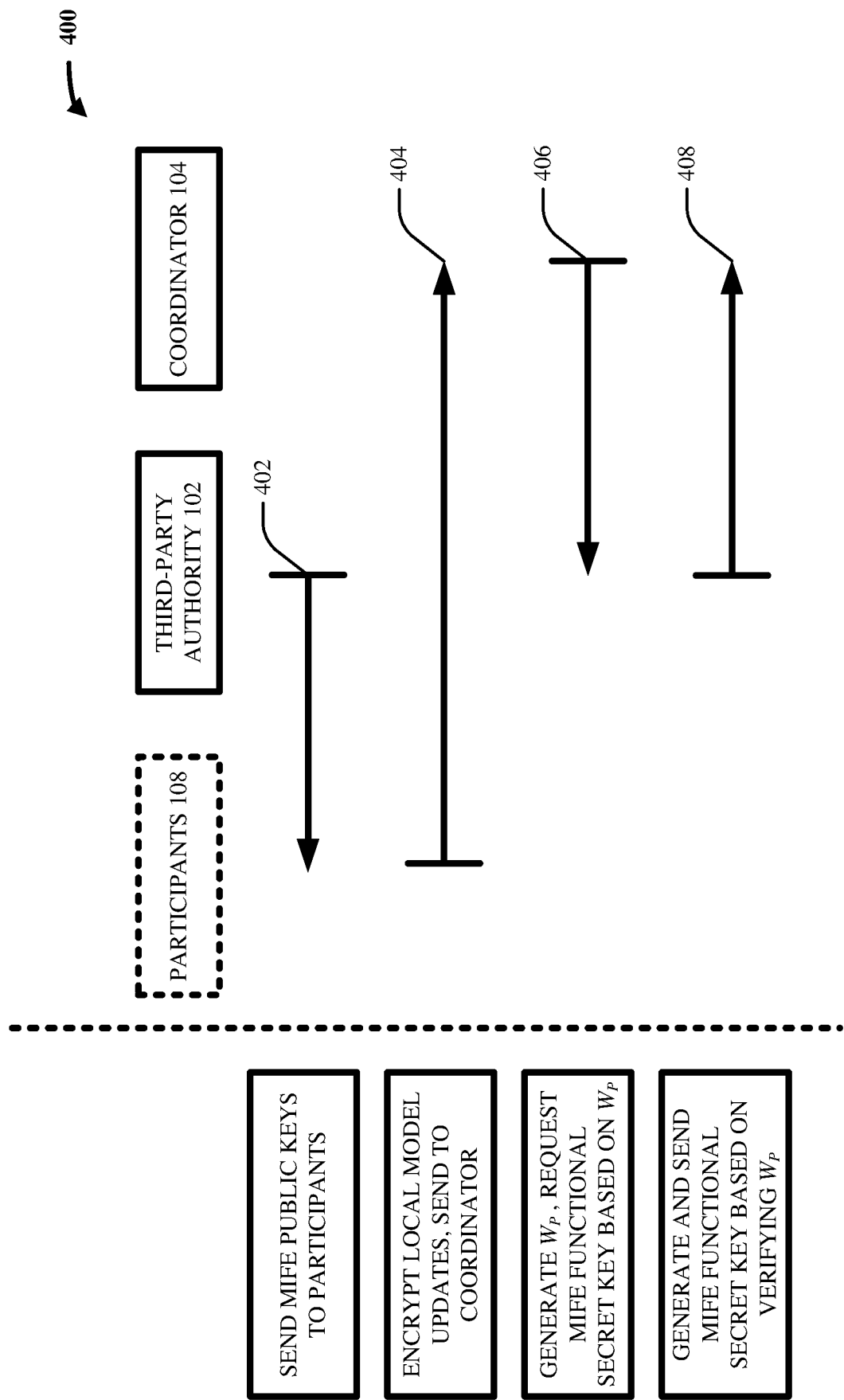
FIG. 4 illustrates a high-level communication diagram illustrating a type-1 NSA communication protocol that facilitates universal and efficient privacy-preserving vertical federated learning in accordance with one or more embodiments described herein.

FIG. 4 illustrates a high-level communication diagram 400 illustrating a type-1 NSA communication protocol that can facilitate universal and efficient privacy-preserving vertical federated learning in accordance with one or more embodiments described herein.

As shown, in communication act 402, the TPA 102 can generate and send, via the key distribution component 114, MIFE public keys to each of the participants 108. In communication act 404, each of the participants 108 can encrypt (e.g., via type-1 NSA encryption) their local model update using its MIFE public key and can accordingly send that encrypted local model update (e.g., via one-way communication) to the coordinator 104. In communication act 406, the coordinator 104 can generate (e.g., via type-1 NSA decryption 302) the participant-related weight vector $w_p$ (e.g., an n-dimensional vector representing the weighted-contribution of each participant in the training iteration) based on the received set of encrypted local model updates and can request an MIFE functional secret key based on $w_p$ (e.g., $sk_{f,w_p}$). In communication act 408, the TPA 102 can verify $w_p$ (e.g., via the inference prevention component 116) and can generate and send, via the key distribution component 114, the MIFE functional secret key to the coordinator 104. The coordinator 104 can then apply (e.g., via type-1 NSA decryption 302) the MIFE functional secret key to the encrypted local model updates to learn the plaintext aggregation (e.g., via an MIFE inner-product computation with $w_p$) of the local model updates without learning the plaintext of the individual local model updates. Note that no communication is required between the participants and that the participants do not need to receive messages from the coordinator 104 (e.g., other than to facilitate entity resolution and to signal the beginning of training).

In various aspects, the coordinator 104 can have some leeway in defining/generating $w_p$. For instance, the coordinator 104 can define $w_p$ as desired (e.g., set the weighted-contributions of each of the participants 108 as desired), with the knowledge that the requested MIFE functional secret key will yield the inner product between $w_p$ and input ciphertext (e.g., the encrypted local model updates). However, if the coordinator 104 manipulates $w_p$ in a suspicious way (e.g., reducing number of non-zero elements below a predetermined threshold, making more requests for an MIFE functional secret key than there are features per sample and/or samples per training batch, and so on), the inference prevention component 116 can mark $w_p$ as invalid and can accordingly send a warning to the participants 108 indicating that the coordinator 104 attempted to launch an inference attack.

Figure 5:
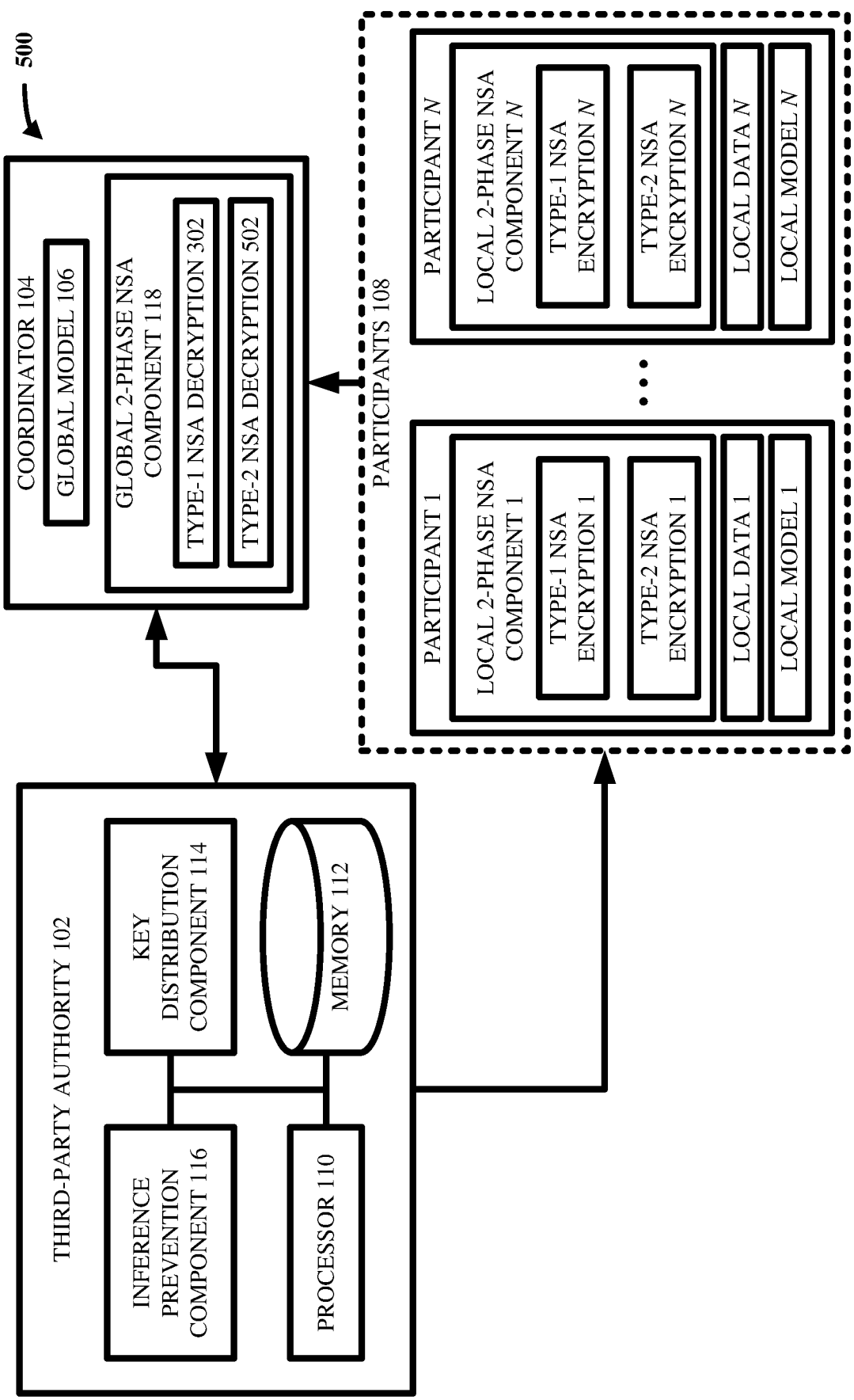
FIG. 5 illustrates a block diagram of an example, non-limiting system including type-2 NSA encryption and decryption that facilitates universal and efficient privacy-preserving vertical federated learning in accordance with one or more embodiments described herein.

FIG. 5 illustrates a block diagram of an example, non-limiting system 500 including type-2 NSA encryption and decryption that can facilitate universal and efficient privacy-preserving vertical federated learning in accordance with one or more embodiments described herein. As shown, the system 500 can, in various embodiments, include the same components as the system 300, and can further comprise type-2 NSA encryption in each of the participants 108 and type-2 NSA decryption 502 in the coordinator 104.

In various aspects, each of the participants 108 can employ type-2 NSA encryption to protect their local dataset (e.g., encrypting local datasets via SIFE public keys), and the coordinator 104 can employ type-2 NSA decryption 502 to securely aggregate the sum of the encrypted local datasets without learning the corresponding plaintext. In various instances, the type-2 NSA decryption 502 of the coordinator 104 can request a functional sample-dimension secret key $sk_{f,u}$ (e.g., SIFE for inner products) based on the results of the type-1 NSA decryption 302 (e.g., based on u), and can apply $sk_{f,u}$, after verification, to securely aggregate the encrypted local datasets into a global update value.

Figure 6:
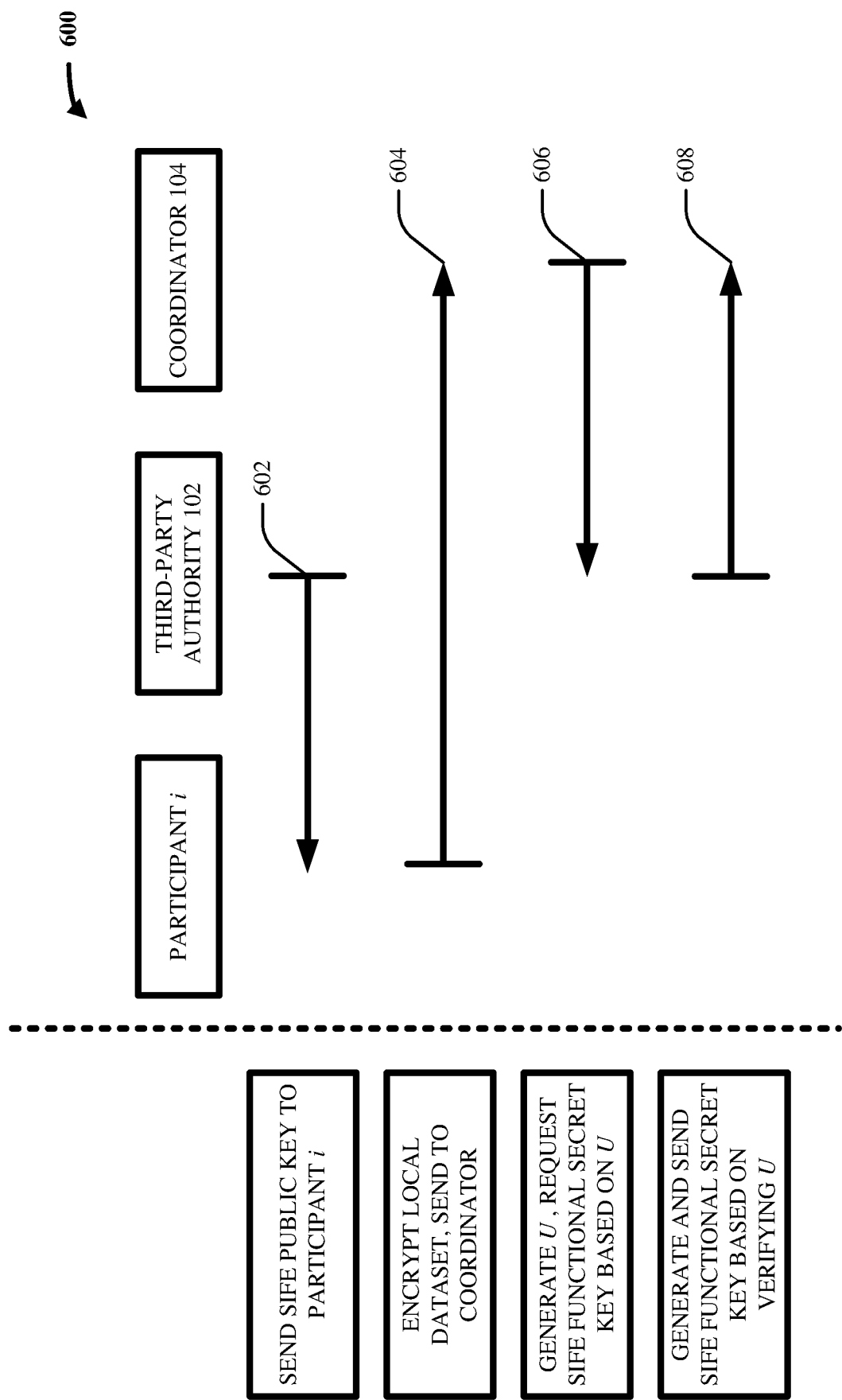
FIG. 6 illustrates a high-level communication diagram illustrating a type-2 NSA communication protocol that facilitates universal and efficient privacy-preserving vertical federated learning in accordance with one or more embodiments described herein.

FIG. 6 illustrates a high-level communication diagram 600 illustrating a type-2 NSA communication protocol that can facilitate universal and efficient privacy-preserving vertical federated learning in accordance with one or more embodiments described herein.

As shown, in communication act 602, the TPA 102 can generate and send, via the key distribution component 114, SIFE public keys to each of the participants 108 (e.g., to an i-th participant $P_i$). In communication act 604, each of the participants 108 can encrypt (e.g., via type-2 NSA encryption) their local dataset using its SIFE public key and can accordingly send that encrypted local dataset (e.g., via one-way communication) to the coordinator 104. In communication act 606, the coordinator 104 can request (e.g., via type-2 NSA decryption 502) an SIFE functional secret key based on u (e.g., $sk_{f,u}$), where u is the aggregated result of applying the functional feature-dimension secret key to the encrypted local model updates. In communication act 608, the TPA 102 can verify u (e.g., via the inference prevention component 116, since the coordinator 104 can potentially manipulate u to attempt an inference attack) and can generate and send, via the key distribution component 114, the SIFE functional secret key to the coordinator 104. The coordinator 104 can then apply, via type-2 NSA decryption 502, the SIFE functional secret key to the encrypted local datasets to learn the plaintext aggregation (e.g., via an SIFE inner-product computation with u) of the local datasets without learning the plaintext of the individual local datasets. The result can be an overall gradient descent update value for the global model 106. Note that no communication is required between the participants and that the participants do not need to receive messages from the coordinator 104. In various embodiments, the type-2 NSA protocol can be more efficient in both encryption and decryption algorithms than the type-1 NSA protocol.

Figure 7:
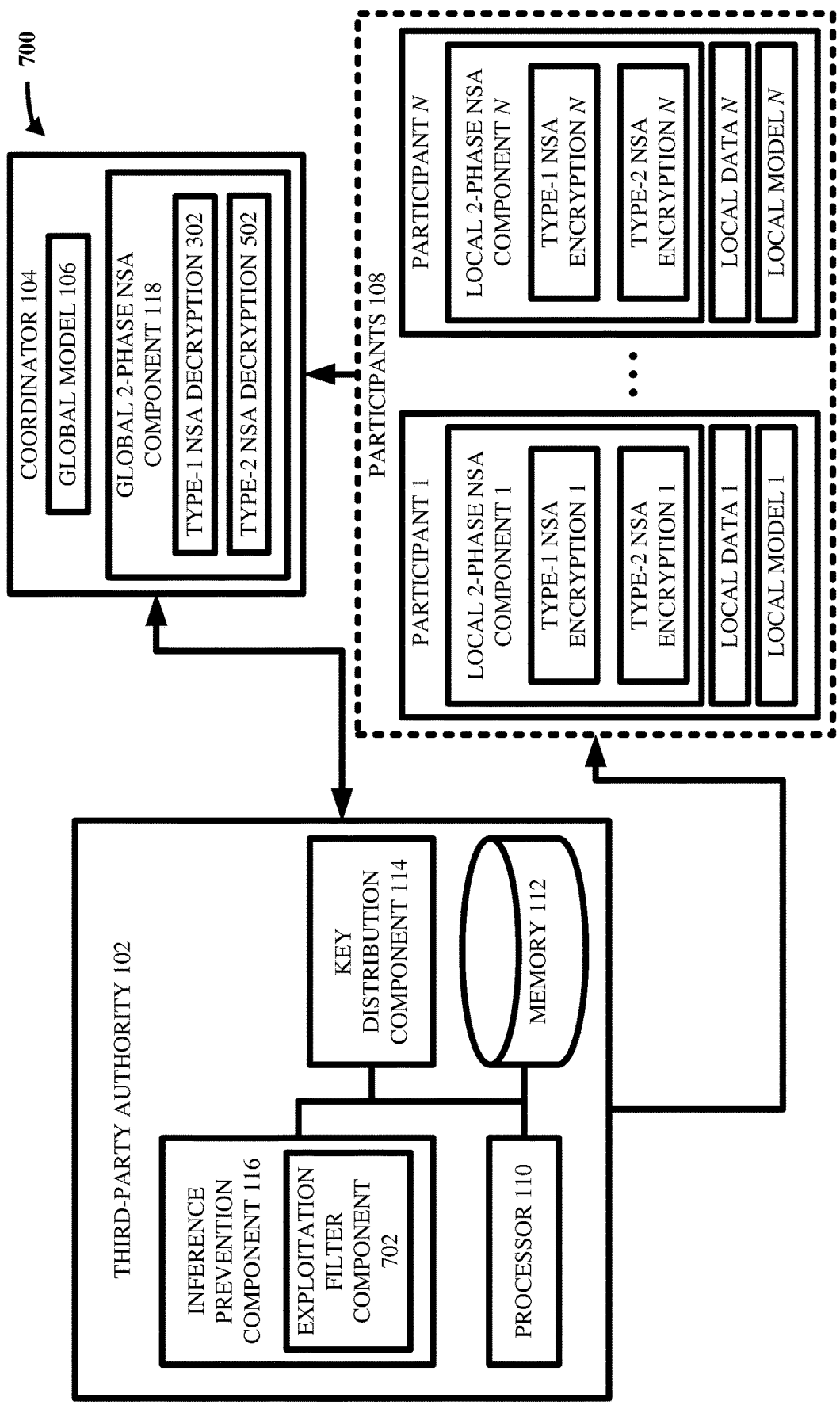
FIG. 7 illustrates a block diagram of an example, non-limiting system including an exploitation filter component that facilitates universal and efficient privacy-preserving vertical federated learning in accordance with one or more embodiments described herein.

FIG. 7 illustrates a block diagram of an example, non-limiting system 700 including an exploitation filter component that can facilitate universal and efficient privacy-preserving vertical federated learning in accordance with one or more embodiments described herein. As shown, the system 700 can, in various embodiments, comprise the same components as the system 500, and can further comprise an exploitation filter component 702.

As mentioned above, the coordinator 104 can launch two types of inference attacks. First, the coordinator 104 can send exploited key-related vectors (e.g., $w_p$ and u) having excessively low amounts of non-zero elements in order to infer the plaintext of elements in an encrypted input vector that correspond to those few non-zero elements (e.g., if $w_p=(0, 1, 0, \ldots, 0)$ and the inner product between x and $w_p$ is known, then the value of the second element in x, which is the non-zero element, can be inferred). Second, the coordinator 104 can store intermediate inner-product results of each iteration to construct a degree-1 system of multivariate polynomial equations (e.g., solving $\theta x^{(i)}=z$ to infer $x^{(i)}$, where $\theta=(\theta_1, \ldots, \theta_{n_{epoch}})$ is constructed from the global model weight of each epoch, and where z is collected from the inner-product of each epoch).

In various embodiments, the exploitation filter component 702 can prevent the first type of inference attack by the coordinator 104. In various instances, the exploitation filter component 702 can check the validity and reliability of the querying vector (e.g., $w_p$ and/or u) that is used for generating the MIFE and SIFE function derived keys by counting a number of non-zero elements of the querying vector. If the number of non-zero elements of the querying vector is less than a predetermined threshold t, the exploitation filter component 702 can mark the querying vector as invalid and can send an electronic communication to one or more of the participants 108 indicating that the coordinator 104 attempted to launch an inference attack. In various aspects, the threshold t can be any suitable and/or desired value (e.g., t=2 would invalidate any querying vector with only one non-zero element, t=5 would invalidate any querying vector with only four non-zero elements, t=1000 would invalidate any querying vector with fewer than 1000 non-zero elements, and so on).

Figure 8:
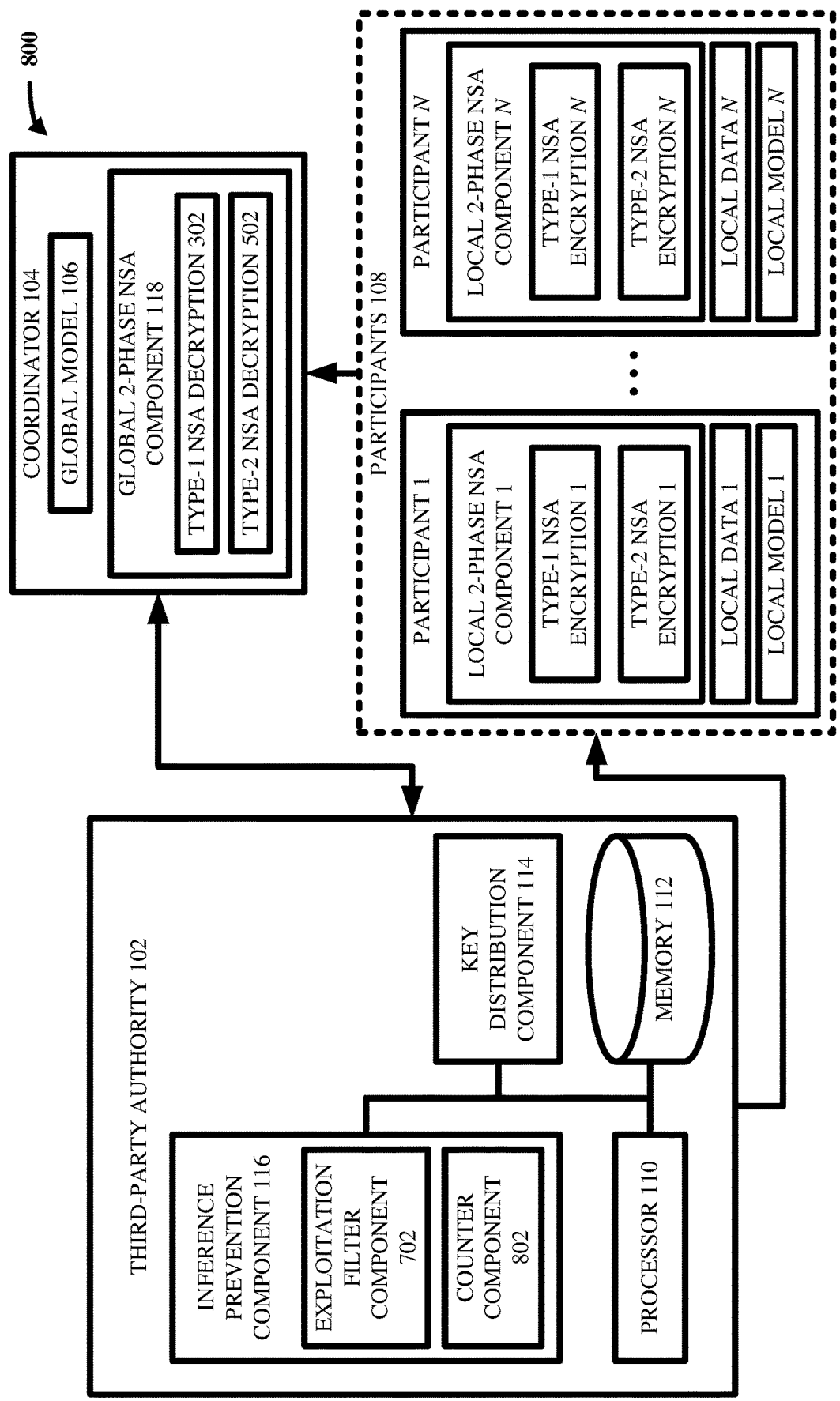
FIG. 8 illustrates a block diagram of an example, non-limiting system including a counter component that facilitates universal and efficient privacy-preserving vertical federated learning in accordance with one or more embodiments described herein.

FIG. 8 illustrates a block diagram of an example, non-limiting system 800 including a counter component that can facilitate universal and efficient privacy-preserving vertical federated learning in accordance with one or more embodiments described herein. As shown, the system 800 can, in various embodiments, comprise the same components as the system 700, and can further comprise a counter component 802.

In various embodiments, the counter component 802 can prevent the second type of inference attack by the coordinator 104. In various aspects, before initiation of the federated training procedure, the coordinator 104 can establish and/or come to a consensus on some hyperparameters to facilitate the training, including a maximum number of features per sample $\eta_f$ (e.g., also called number of features) and a maximum number of samples per batch $n_b$ (e.g., also called a sample batch size). In various instances, the counter component 802 can count the number of type-1 NSA secret key requests $c_{type1}$ made by the coordinator 104 as well as the number of type-2 NSA secret key requests $c_{type2}$ made by the coordinator 104. Solving a system of linear multivariate polynomial equations can require the number of equations (e.g., $\eta_{epoch}$) to be greater than or equal to the number of variables (e.g., the number of features of one sample and/or the number of samples per batch). To prevent such an inference attack, the number of training epochs $$\left(\text{e.g., } \max\left(\frac{c_{Type1}}{n_b}, \frac{c_{Type2}}{n_f}\right)\right)$$

should be less than both $\eta_f$ and $n_b$. That is, in various aspects, the counter component 802 can invalidate a query vector if $$\max\left(\frac{c_{Type1}}{n_b}, \frac{c_{Type2}}{n_f}\right) \geq \min(n_b, n_f).$$

In various aspects, if a query vector (e.g., $w_p$ and/or u) is validated by both the exploitation filter component 702 and the counter component 802, the requested functional secret key can be generated and distributed by the key distribution component 114. In various aspects, if a query vector is invalidated by either the exploitation filter component 702 and/or the counter component 802, the requested functional secret key can be not generated and/or can be withheld, and an alert can be sent to the participants 108. In various aspects, the inference prevention component 116 can leverage both the exploitation filter component 702 and the counter component 802 to detect and prevent all types of inference attacks that an honest-but-curious coordinator 104 can attempt to launch.

In various embodiments, the subject claimed innovation can also prevent all types of inference attacks by curious and/or malicious participants. After all, embodiments of the subject claimed innovation do not require any inter-participant communication and/or exchange of information. Moreover, even if malicious and colluding participants could collect encrypted local model updates by other participants, efforts to brute-force infer the other participants' confidential information by exploiting their own public keys and their other partial training samples would be unsuccessful. This is because, in various embodiments, the MIFE public key for each participant can be different (e.g., non-uniform MIFE public keys). Moreover, since the participants 108 have vertically partitioned datasets, each participant has its own feature subspace with its own data distribution and data content (unlike with horizontally partitioned datasets). Furthermore, even though each participant can, in various embodiments, share the same SIFE public key, the generated ciphertext can be different for the same input data, which can be guaranteed by the adopted SIFE scheme.

FIGS. 9-10 illustrate high-level diagrams 900 and 1000 of example, non-limiting algorithms (e.g., algorithms 1, 2, and 3) that can facilitate universal and efficient privacy-preserving vertical federated learning in accordance with one or more embodiments described herein. Consider FIGS. 9-10 in view of the formalism presented below.

The discussion below can present various details regarding how to adopt and/or integrate the above-described two types of non-interactive secure aggregation protocols (e.g., type-1 NSA protocol facilitated by the type-1 NSA encryption and type-1 NSA decryption 302, type-2 NSA protocol facilitated by the type-2 NSA encryption and type-2 NSA decryption 502, and so on) into a gradient descent computation and a loss computation in the training phase of private vertical federated learning.

Suppose that there is a global dataset $D=\{(x^{(1)}, y^{(1)}), \ldots, (x^{(n)}, y^{(n)})\}$, where $x^{(i)}=(x_1^{(i)}, \ldots, x_d^{(i)}), x_j^{(i)} \in \mathbb{R}^d$, and $y^{(i)} \in \mathbb{R}$, with a feature space $F^d$. Here, the superscript with parentheses (e.g., (i)) can represent a sample identifier, and a subscript can represent a feature identifier of a sample.

Suppose that there exists l participants in the federated learning framework, denoted as a set $P=\{p_1, \ldots, p_l\}$. In the vertically partitioned data setting, without losing generality, suppose that the participant $p_k$ has a subset of features of data samples, denoted as $F_{pk}$, and that there exists a group of participants $P' \subseteq P$ such that $D_P$, can form the global dataset D. That is, $\forall (p_i, p_j)_{i \neq j} \in P$, $F_{pi} \cap F_{pj} = \emptyset$ and $F_{pi} \cup F_{pj} = F^d$. Also, assume that only one participant (e.g., the active participant) has the class labels $y^{(i)}$ in the federated learning setting, while other participants do not (e.g., passive participants). Without loss of generality and for the sake of simplicity, let $p_l$ be the active participant that has the dataset $D_{p_l} = (x_{p_l}^{(1)}, \ldots, x_{p_l}^{(n)})$ and $y=(y^{(1)}, \ldots, y^{(n)})$, and $p_2, \ldots, p_l$ be the passive participants, where the participant $p_i$ has the dataset $D_{p_i} = (x_{p_i}^{(1)}, \ldots, x_{p_i}^{(n)})$.

The goal of the vertical federated learning framework can be to train a global machine learning model M over the dataset $D=(D_{p_1}, \ldots, D_{p_l}; y)$ from the participant set P without leaking each participant's data $D_{pi}$.

Algorithm 1 in FIG. 9 depicts a privacy-preserving federated learning framework that implements a mini-batch stochastic gradient descent (SGD) optimization approach. As shown, line 1 of Algorithm 1 can involve initializing the cryptosystem and delivering the public keys to the participants. Line 2 can involve performing privacy-preserving entity resolution (e.g., bloom filter resolution, recode matching based on error-tolerant anonymous linking code, and so on). In various embodiments, entity resolution can be performed via an anonymous linking code technique called cryptographic longterm key and matching method called Dice coefficient. Line 3 can involve randomly initializing the machine learning model's parameters (e.g., w). Line 4 can involve establishing training hyperparameters (e.g., $n_f$, $n_b$, t, and so on). Lines 5-12 can involve performing iterative updates to the model's parameters. Specifically, lines 6-9 can involve performing a secure SGD computation and accordingly updating the model's parameters. Lines 10-11 can involve performing a secure loss computation and breaking the iterations when a convergence criterion is achieved.

Algorithm 2 depicts embodiments of the 2-Phase NSA approach described herein. As shown, the system can receive as inputs the current model weights w, the complete feature space $F^d$, and the participants P, where each participant $p_i$ has an assigned training hyperparameter $\pi_{pi}$, local dataset $D_{pi}$, and both an MIFE and an SIFE public key. Lines 1-12 can depict procedures/actions carried out by the coordinator 104, and lines 13-18 can depict procedures/actions carried out by the participants 108. As shown in lines 2-4, for each mini-batch iterative phase, the coordinator 104 can send a query to each participant $p_i$ with appropriate hyperparameters $\pi_{pi}$ (e.g., entity resolution permutation parameters) and current model weight $w_{pi}$. Then, each participant can adjust their local dataset according to the hyperparameters $\pi_{pi}$ such as reordering the dataset as required by the privacy-preserving entity resolution and dividing the dataset into proper mini batches, as shown in line 14. For each mini batch, the participant can protect the local/partial model from feature-dimension and sample-dimension aspects by using the type-1 NSA and type-2 NSA protocols respectively, and then can send to the coordinator 104 two types of ciphertext, as shown in lines 15-18. After receiving sufficient responses from the participants 108, the coordinator 104 can execute the type-1 NSA protocol to generate the feature-dimension aggregation results (e.g., generating $w_p$ to request an MIFE-inner-product secret key, and applying that MIFE secret key to the encrypted local model updates of each participant to yield $u=(u_{p1}, \ldots, u_{pl}))$, as shown in lines 7-11. The coordinator 104 can then execute the type-2 NSA protocol to generate the batch-dimension aggregation results (e.g., requesting an SIFE-inner-product secret key based on u, and applying that SIFE secret key to the encrypted local datasets to yield the global model update $\nabla E_D(w)$). In various embodiments, similar operations can occur at the secure loss computation phase as described in Algorithm 1.

Algorithm 3, shown in FIG. 10, depicts procedures/actions that can be facilitated by embodiments of the inference prevention component 116. As shown, lines 2-7 can involve forwarding a functional secret key request from the coordinator 104 to the key distribution component 114 based on both the exploitation filter component 702 and the counter component 802 validating the query vector. Lines 8-10 can involve counting the non-zero elements in the query vector (e.g., via the exploitation filter component 702). Lines 11-16 can involve counting and comparing the number of training epochs with both the maximum number of features per sample and the maximum number of samples per batch (e.g., via the counter component 802).

In various embodiments, the subject claimed innovation can facilitate efficient privacy-preserving vertical federated learning under the SGD training approach, no matter what kind of machine learning model is being trained. In various aspects, the type-1 NSA protocol can be considered as performing feature-dimension linear aggregation with feature related inputs from multiple participants, while the type-2 NSA protocol can be considered as performing sample/batch-dimension linear aggregation with inputs from a single participant that relies on the output of the type-1 NSA protocol.

In various embodiments, such two kinds of aggregation computation could be linear or non-linear due to different underlying machine learning algorithms, such as linear classification models and/or non-linear logistic regression and/or tree ensemble models. In various embodiments, an approximation approach can be implemented, where non-linear computations are transferred to linear computations by applying Taylor approximation. In such cases, a non-linear model can be trained using embodiments of the TPA 102. In various embodiments, a Decomposition-then-2-Phase-NSA approach can be implemented, where the gradient descent computation is properly decomposed into fine-grained level linear computations. This is described in more detail below.

In various embodiments, the following theorem holds true: the proposed 2-Phase NSA protocol and its variant decomposition-then-2-Phase-NSA protocol are generic approaches to address secure computation tasks in SGD-based vertical federated learning. Consider the following proofs.

For a linear model (e.g., a linear global model 106), suppose the linear model is defined as:

$$f(x; w) = w_0 x_0 + w_1 x_1 + \ldots + w_l x_l,$$

where $x_0^{(i)}=1$ represents the bias term. For brevity, the vector format is used throughout: $f(x; w)=w^T x$, where $x \in \mathbb{R}^{d+l}$, $w \in \mathbb{R}^{d+l}$, and $x_0=1$. Also, suppose that the loss function is a least-squares function, defined as:

$$L(f(x; w), y) = (f(x; w) - y)^2$$

where the L2-norm is used as the regularization term R, defined as: $R(w) = \frac{1}{2} \sum_{i=1}^{m} w_i^2$. It can be shown that the normal gradient $\nabla E_S(w)$ over the mini-batch S is computed as follows:

$$\nabla E_S(w) = \frac{2}{n_s} \sum_i^{n_s} (w^T x^{(i)} - y^{(i)}) x^{(i)} + \sum_j^d w_j.$$

Then, the secure gradient computation can be described as follows, where $u_{p_1}$ corresponds to the active party:

$$\nabla = \frac{2}{n} \sum_i^n \left( w_0 x_0^{(i)} + (w_1 x_1^{(i)} - y^{(i)})_{(u_{p_1})} + (w_2 x_2^{(i)})_{(u_{p_2})} + \ldots + (w_l x_l^{(i)})_{(u_{p_l})} \right) x^{(i)} =$$

-continued $$\frac{2}{n}\sum_{i}^{n}\sum_{j}^{d}\left(u_{p_j}^{(i)}\right)x^{(i)}$$

which is compatible with type-1 NSA. Note that the regularization term can be ignored as the coordinator 104 can compute it independently. Next, let $u^{(i)} = \rho_j^d u_{pj}^{(i)}$ be the intermediate value to represent the difference-loss for current w over one sample $x^{(i)}$, which is also the aggregation result of type-1 NSA. Then, the updated gradient $\nabla E(w)$ is continually computed as follows:

$$\nabla = \frac{2}{n}\sum_{i}^{n}u^{(i)}\left(x_0^{(i)}, x_1^{(i)}, \ldots, x_{l-1}^{(i)}, x_l^{(i)}\right) =$$

$$\frac{2}{n}\left(\sum_{i}^{n}u^{(i)}x_0^{(i)}, \sum_{i}^{n}u^{(i)}x_{1,p_1}^{(i)}, \ldots, \sum_{i}^{n}u^{(i)}x_{l,p_l}^{(i)}\right),$$

which is compatible with type-2 NSA. To deal with the secure computation task of training loss as described in Algorithm 1, only type-1 NSA is needed. As the average loss function here is least-squares function, the secure computation is described as:

$$L_D(w) = \frac{1}{n}\sum_{i}^{n}\left(w^T x^{(i)} - y^{(i)}\right)^2,$$

where type-1 NSA can clearly satisfy the computation task.

For a non-linear model, supposed the non-linear model is a logistic regression model that has the following fitting/prediction function:

$$f(x; w) = \frac{1}{1 + e^{-w^T x}}.$$

For a binary label $y \in \{0,1\}$, the loss function could be defined as:

$$L_D(f(x; w), y) = \begin{cases} -\log(f(x; w)); & \text{if } y = 1 \\ -\log(1 - f(x; w)); & \text{if } y = 0 \end{cases}.$$

Next, the normal gradient computation in the case of mini-batch S can be described as:

$$\nabla E_S(w) = \frac{1}{n}\sum_{i \in S}^{n}\left(\frac{1}{1 + e^{-w^T x^{(i)}}} - y^{(i)}\right)x^{(i)}.$$

Note that the regularization term can be ignored for the same reason discussed above. Now, if a Taylor approximation approach is taken, it is known from Taylor series expansion that $$\log(1 + e^{-z}) = \log 2 - \frac{1}{2}z + \frac{1}{8}z^2 + O(z^4).$$

Applying this expansion to the above normal gradient computation yields:

$$\nabla E_S(w) \sim \frac{1}{n}\sum_{i \in S}^{n}\left(\frac{1}{4}w^T x^{(i)} - y^{(i)} + \frac{1}{2}\right)x^{(i)}.$$

It is then possible to apply 2-Phase NSA in this secure computation. If a decomposition approach is taken instead, the following decomposition can be obtained:

$$f(x; w) = g(h(x; w)) = \frac{1}{1 + e^{-h(x;w)}}; \text{ where } h(x; w) = w^T x.$$

The sigmoid function $$g(z) = \frac{1}{1 + e^{-z}}$$

in not linear function, while $h(x; w)$ is linear. Then, it is possible to apply 2-Phase NSA on the linear $h(x; w)$. Specifically, the formal description of secure gradient computation is given as:

$$\nabla = \frac{1}{n}\sum_{i \in S}^{n}\left(\frac{1}{1 + e^{-\Sigma_j^d\left(u_{p_j}^{(i)}\right)}} - y^{(i)}\right)x^{(i)}$$

which is compatible with type-1 NSA. It can further be shown that:

$$\nabla = \frac{1}{n}\left(\sum_{i}^{n}u^{(i)}x_0^{(i)}, \sum_{i}^{n}u^{(i)}x_{1,p_1}^{(i)}, \ldots, \sum_{i}^{n}u^{(i)}x_{l,p_l}^{(i)}\right),$$

which is compatible with type-2 NSA. Note that the output of type-1 NSA is in plaintext, and hence the coordinator 104 can compute the sigmoid function and labels. The secure loss computation can be described as:

$$E_D(w) = -\frac{1}{n}\sum_{i \in D}^{n}y^{(i)}\log\left(\frac{1}{1 + e^{-w^T x^{(i)}}}\right) + (1 - y^{(i)})\log\left(1 - \frac{1}{1 + e^{-w^T x^{(i)}}}\right).$$

Similar to secure gradient descent computation, however, only the type-1 NSA with subsequent normal computation is needed. Note that in this Decomposition-then-2-Phase-NSA approach, it requires exposing the labels to the coordinator 104, unless the active participant plays the role of the coordinator 104.

For a tree ensemble model (e.g., XGBoost), the prediction function can be defined as $f(x; T) = \Sigma_{k=1}^{K} f_k(x)$, where $f_k \in T$ is a regression tree. To learn the set of regression tree models, it can greedily add a tree $f_t$ at the t-th iteration to minimize the loss function with second-order approximation:

$$L_D^{(t)} = \sum_{i=1}^{n} l\left(y_i, \hat{y}_i^{(t-1)} + f_t(x_i)\right) \sim \sum_{i=1}^{n}\left[l\left(y_i, \hat{y}_i^{(t-1)}\right) + g_i f_t(x_i) + \frac{1}{2}h_i f_t^2(x_i)\right],$$

where $g_i=\partial_{\hat{y}^{(t-1)}}l(y_i, \hat{y}_i^{(t-1)})$ and $h_i=\partial_{\hat{y}^{(t-1)}}^2 l(y_i, \hat{y}_i^{(t-1)})$. Note that the regularization term $\Omega(f_t)$ can be ignored for the same reason as above. Usually, when constructing the regression tree in the t-th iteration, it starts from the tree with depth of 0 and adds a split for each leaf node of the tree until reaching the maximum depth. The split that maximizes the score of the following equation can be selected as the best split $L_{split}$ as follows:

$$\frac{1}{2}\left[\frac{\left(\sum_{i\in I_L} g_i\right)^2}{\sum_{i\in I_L} h_i + \lambda} + \frac{\left(\sum_{i\in I_R} g_i\right)^2}{\sum_{i\in I_R} h_i - \lambda} - \frac{\left(\sum_{i\in I} g_i\right)^2}{\sum_{i\in I} h_i - \lambda}\right] - \gamma.$$

To determine the best split, each participant in the federated learning phase can determine the local optimal split independently with only its local data. All participants need to send all possible $g_l=\Sigma_{i\in I_L} g_i$ and $h_l=\Sigma_{i\in I_L} h_i$ to the coordinator 104 in a confidential way. It is clearly possible to use the 2-Phase NSA approach to securely aggregate $g_l$ and $h_l$.

As mentioned above, various embodiments of the subject claimed innovation can facilitate universal and efficient privacy-preserving vertical federated learning, even with a dynamic/changing number of participants 108. Existing systems/techniques rely on inter-participant communication, and so participant dropout and addition are limited. Since embodiments of the subject claimed innovation do not require any inter-participant communication, join-in and drop-out behavior can be accommodated. The only requirement is that, for each iteration, the received encrypted vertical partial model is able to form a complete set of features for the target machine learning model. Specifically, to train a target model M, suppose that it requires features $F^d=(F_1, \ldots, F_d)$ that are owned by different participants. For simplicity, divide all participants into different groups, where $\forall i \in \{1, \ldots, d\}$, $P_i \subset P$ and the participants in the group $P_i$ own the dataset with feature $F_i$. Then, for each mini-batch iteration, the coordinator 104 can send a query to all participants in each group $P_i$, and can receive corresponding responses $res_{pi}$. The allowed dynamic range of participants can be $\forall i \in \{1, \ldots, d\}$, $|res_{pi}| \geq 1$, which means that the $$\frac{n-1}{n}$$

participants in $P_i$ are free to join in and drop out at any training iteration.

As mentioned above, existing systems/techniques primarily rely on homomorphic encryption and require chain-based and/or broadcast-based interaction between the participants. Moreover, such systems/techniques cannot easily scale past two participants. In stark contrast, embodiments of the subject claimed innovation leverage hybrid functional encryption (e.g., MIFE and SIFE) rather than homomorphic encryption, do not require any communication between participants, and can easily accommodate over two participants as well as changing numbers of participants. In theory, if existing systems were extended to n participants (e.g., which has not been facilitated in the prior art), they would require 4n−2 total communications during the SGD phase, while embodiments of the subject claimed innovation only require n communications (e.g., each participant simply sends one communication to the coordinator 104, containing it encrypted local model update and its encrypted local dataset). Moreover, such existing systems, if extended, would require $(n^2-3n)/2$ communications during the secure loss computation, while embodiments of the subject claimed innovation would again require only n total communications.

Experiments conducted by the inventors of the subject claimed innovation confirmed that embodiments employing 2-Phase NSA protocols achieved comparable model accuracy as existing systems/techniques for facilitating vertical federated learning while requiring merely a fraction of the training time. Specifically, experiments indicated that embodiments of the subject claimed innovation required around 4 seconds to fully train a global logistic regression model using two participants, while homomorphic encryption techniques required 1.8 hours for around 150 iterations in the same framework. Experiments also indicated that embodiments of the subject claimed innovation achieved comparable model accuracy regardless of the number of participants in the federated learning framework, with the only difference being that embodiments of the subject claimed innovation can experience linear increases in training time as the number of participants rises. In some cases, embodiments of the subject claimed innovation required only about 10 seconds to train a logistic regression model using 14 participants.

Figure 11:
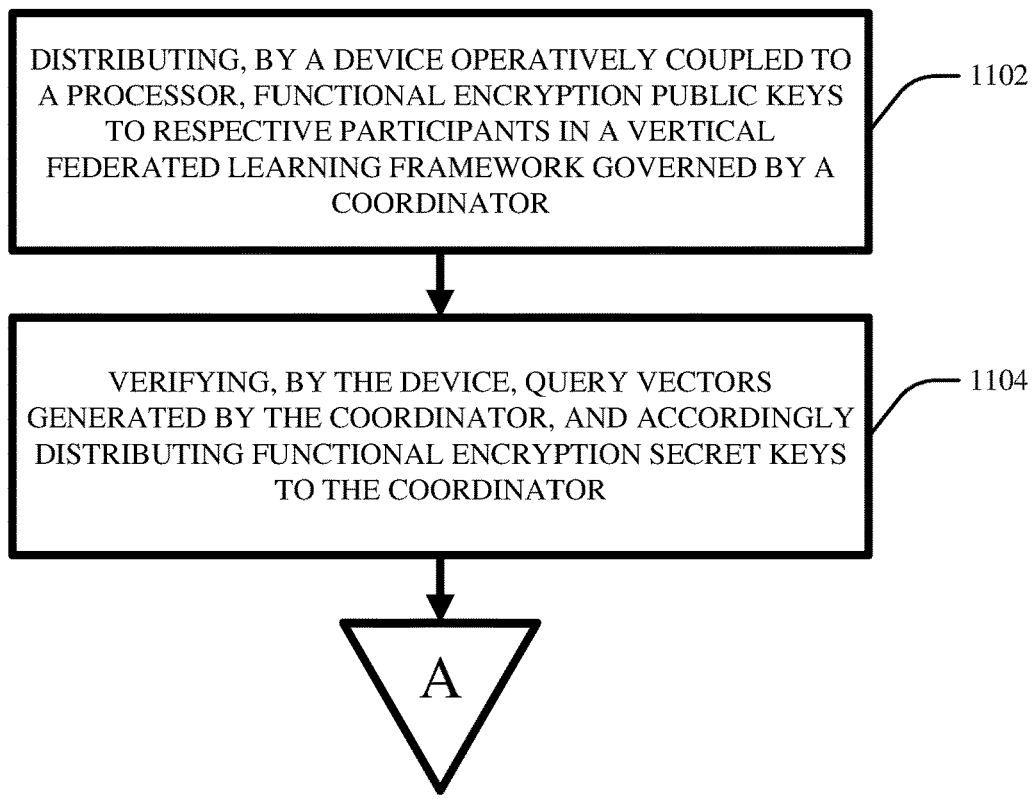
FIG. 11 illustrates a flow diagram of an example, non-limiting computer-implemented method that facilitates universal and efficient privacy-preserving vertical federated learning in accordance with one or more embodiments described herein.

FIG. 11 illustrates a flow diagram of an example, non-limiting computer-implemented method 1100 that can facilitate universal and efficient privacy-preserving vertical federated learning in accordance with one or more embodiments described herein.

In various embodiments, act 1102 can include distributing, by a device operatively coupled to a processor, functional encryption public keys (e.g., MIFE and/or SIFE public keys) to respective participants (e.g., participants 108) in a vertical federated learning framework governed by a coordinator (e.g., coordinator 104).

In various instances, act 1104 can include verifying, by the device, query vectors (e.g., $w_p$ or u) generated by the coordinator, and accordingly distributing functional encryption secret keys (e.g., MIFE and/or SIFE functional secret keys) to the coordinator.

Figure 12:
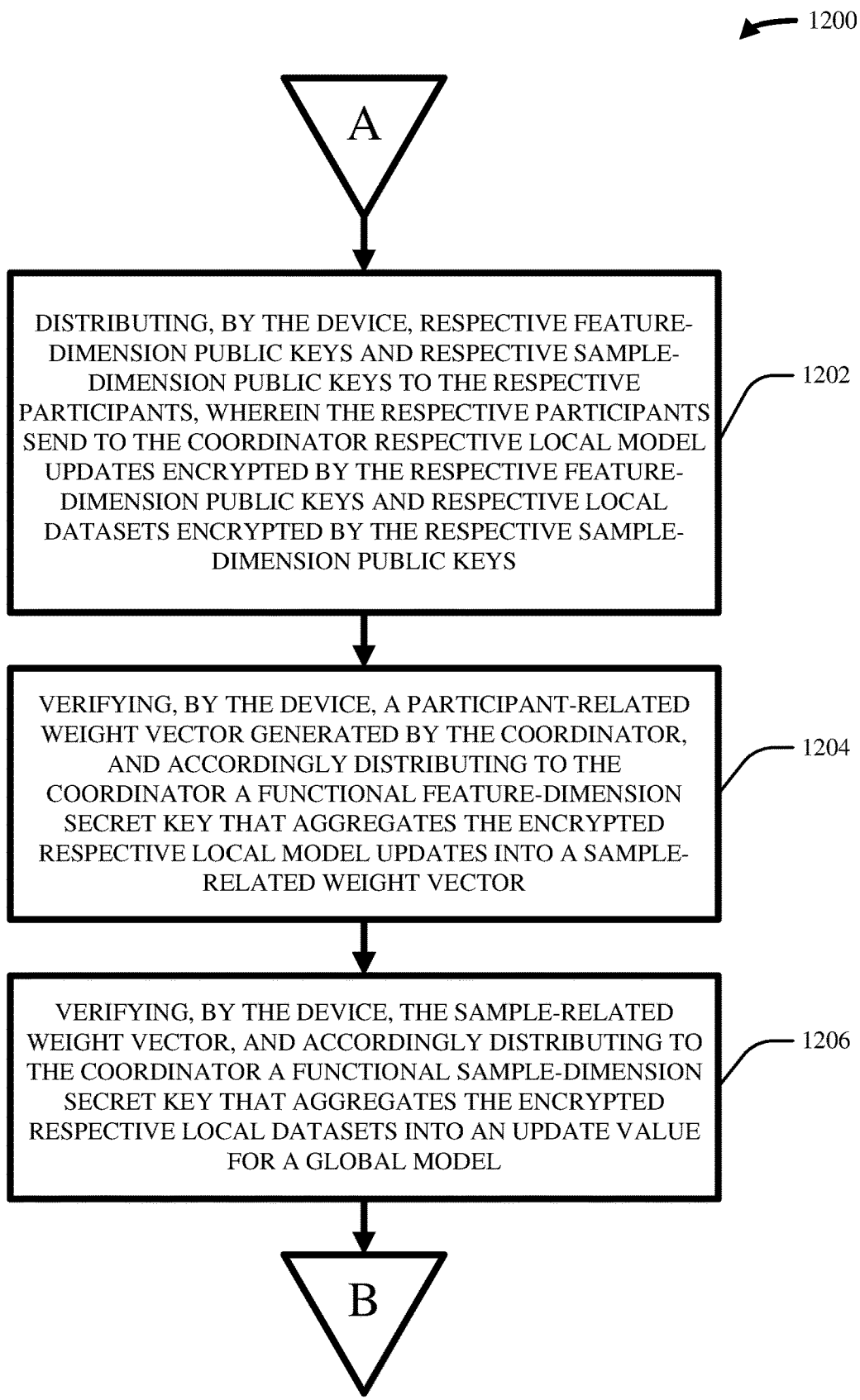
FIG. 12 illustrates a flow diagram of an example, non-limiting computer-implemented method that facilitates universal and efficient privacy-preserving vertical federated learning in accordance with one or more embodiments described herein.

FIG. 12 illustrates a flow diagram of an example, non-limiting computer-implemented method 1200 that can facilitate universal and efficient privacy-preserving vertical federated learning in accordance with one or more embodiments described herein. As shown, the computer-implemented method 1200 can, in various embodiments, comprise the same acts as the computer-implemented method 1100, and can further comprise acts 1202, 1204, and 1206.

In various embodiments, act 1202 can include distributing, by the device, respective feature-dimension public keys (e.g., MIFE public keys) and respective sample-dimension public keys (e.g., SIFE public keys) to the respective participants, wherein the respective participants send to the coordinator respective local model updates (e.g., local model 1, . . . , local model n) encrypted by the respective feature-dimension public keys and respective local datasets (e.g., local data 1, . . . , local data n) encrypted by the respective sample-dimension public keys.

In various instances, act 1204 can include verifying, by the device, a participant-related weight vector (e.g., $w_p$) generated by the coordinator, and accordingly distributing to the coordinator a functional feature-dimension secret key (e.g., $sk_{f,w_p}$) that aggregates the encrypted respective local model updates into a sample-related weight vector (e.g., u).

In various aspects, act 1206 can include verifying, by the device, the sample-related weight vector, and accordingly distributing to the coordinator a functional sample-dimension secret key (e.g., $sk_{f,u}$) that aggregates the encrypted respective local datasets into an update value for a global model (e.g., global model 106).

Figure 13:
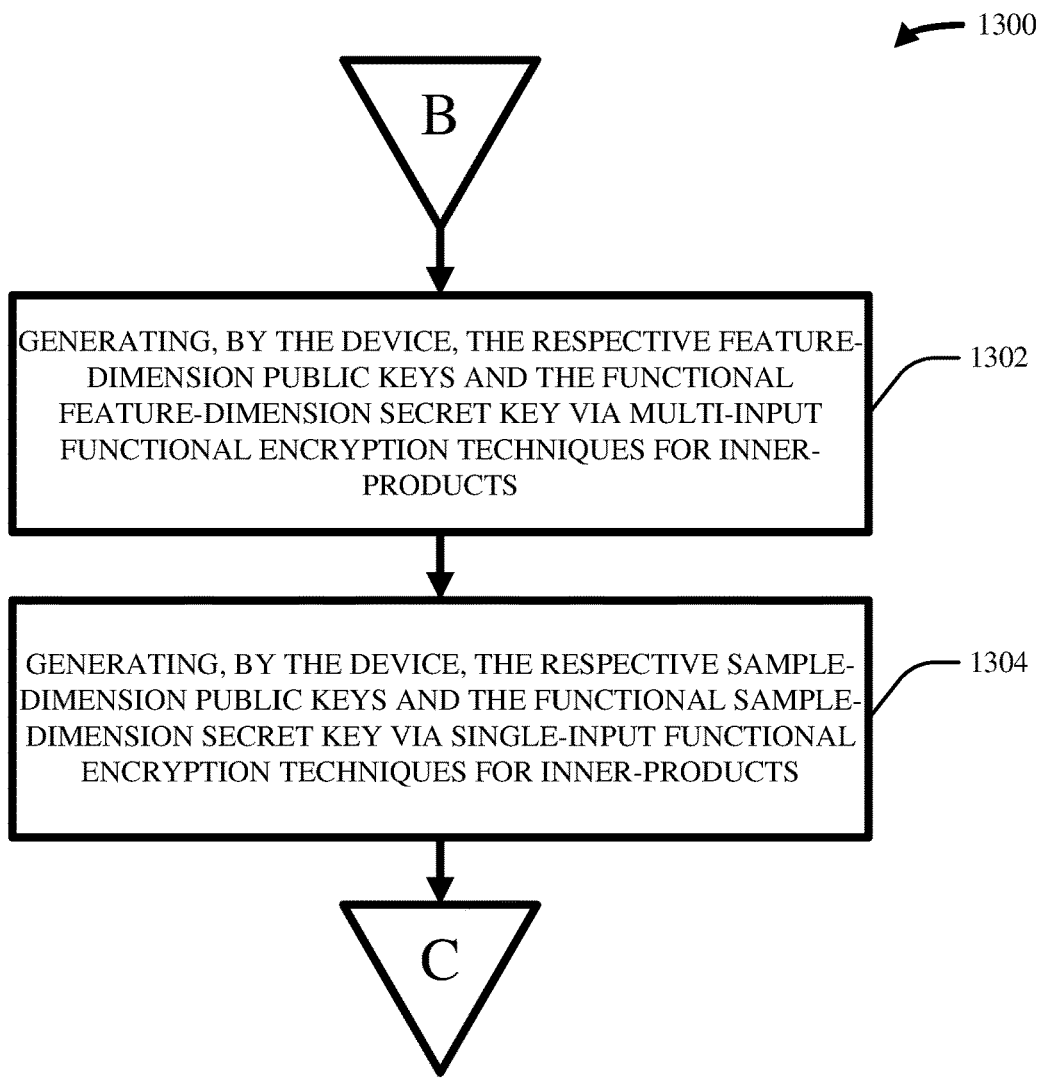
FIG. 13 illustrates a flow diagram of an example, non-limiting computer-implemented method including MIFE and SIFE functional encryption techniques that facilitates universal and efficient privacy-preserving vertical federated learning in accordance with one or more embodiments described herein.

FIG. 13 illustrates a flow diagram of an example, non-limiting computer-implemented method 1300 including MIFE and SIFE functional encryption techniques that can facilitate universal and efficient privacy-preserving vertical federated learning in accordance with one or more embodiments described herein. As shown, the computer-implemented method 1300 can, in various embodiments include the same acts as the computer-implemented method 1200, and can further comprise acts 1302 and 1304.

In various embodiments, act 1302 can include generating, by the device, the respective feature-dimension public keys and the functional feature-dimension secret key via multi-input function encryption (MIFE) techniques for inner-products.

In various instances, act 1304 can include generating, by the device, the respective sample-dimension public keys and the functional sample-dimension secret key via single-input function encryption (MIFE) techniques for inner-products.

Figure 14:
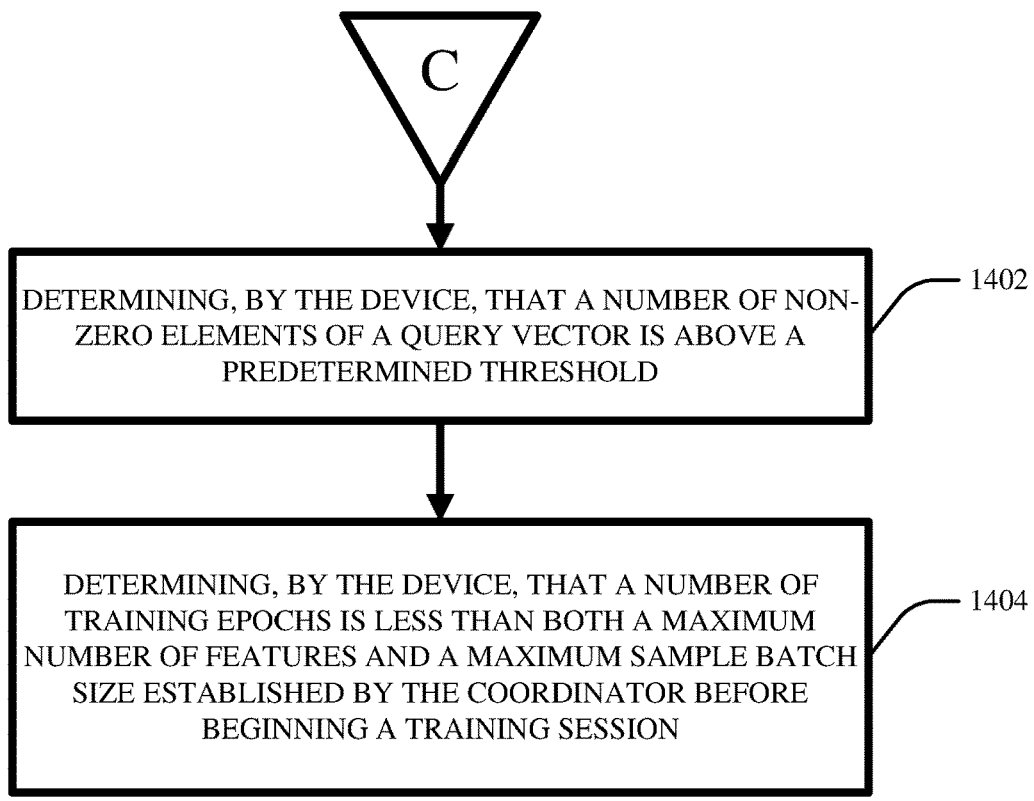
FIG. 14 illustrates a flow diagram of an example, non-limiting computer-implemented method for inference prevention that facilitates universal and efficient privacy-preserving vertical federated learning in accordance with one or more embodiments described herein.

FIG. 14 illustrates a flow diagram of an example, non-limiting computer-implemented method 1400 for inference prevention that facilitates universal and efficient privacy-preserving vertical federated learning in accordance with one or more embodiments described herein. As shown, the computer-implemented method 1400 can, in various embodiments include the same acts as the computer-implemented method 1300, and can further comprise acts 1402 and 1404.

In various embodiments, act 1402 can include determining, by the device, that a number of non-zero elements of a query vector (e.g., $w_p$ or u) is above a predetermined threshold. If this is false, the query vector can be marked invalid.

In various instances, act 1404 can include determining, by the device, that a number of training epochs is less than both a maximum number of features (e.g., $n_f$) and a maximum sample batch size (e.g., nb) established by the coordinator before beginning a training session. If this is false, the query vector can be marked invalid.

Figure 15:
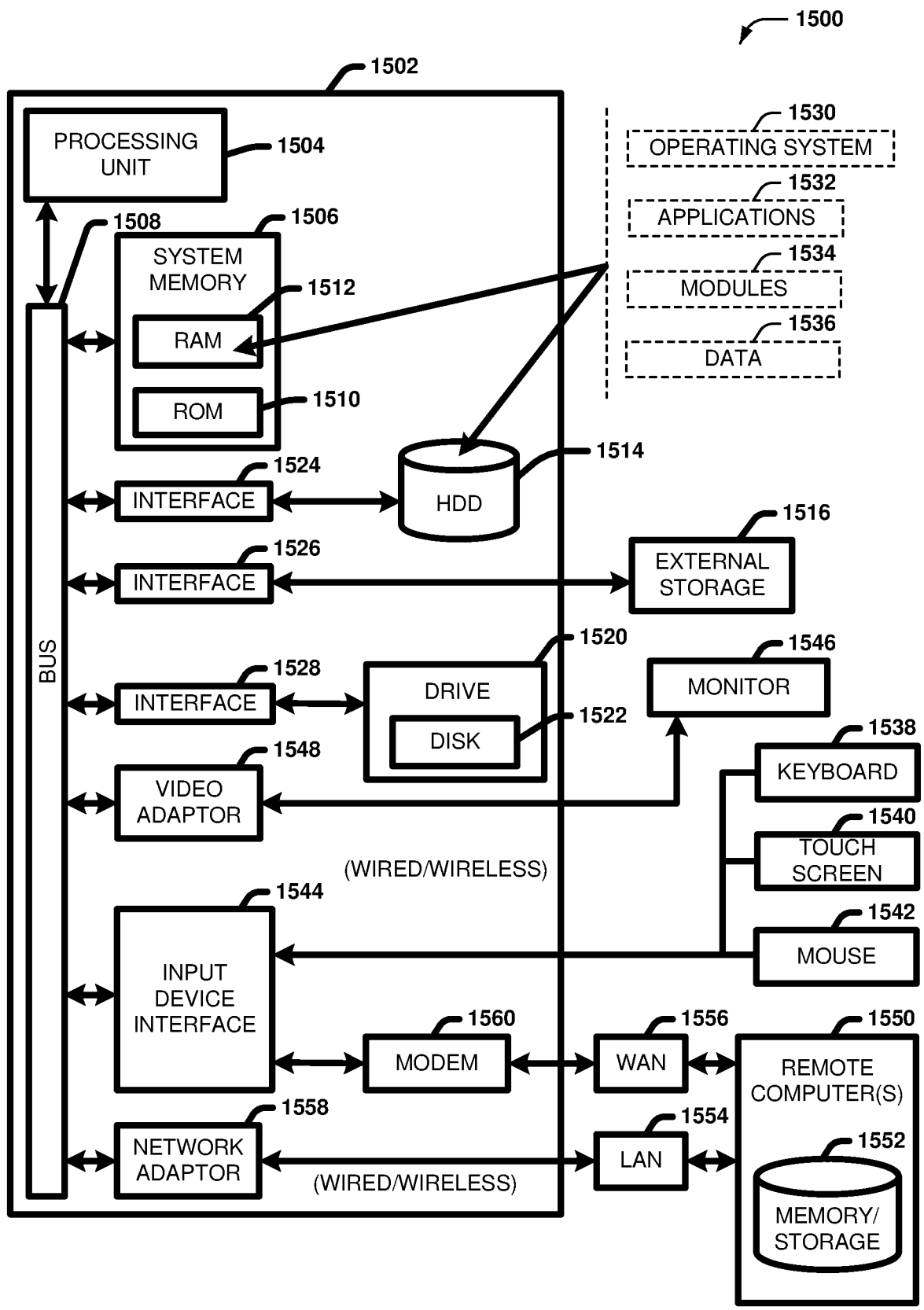
FIG. 15 illustrates a block diagram of an example, non-limiting operating environment in which one or more embodiments described herein can be facilitated.

In order to provide additional context for various embodiments described herein, FIG. 15 and the following discussion are intended to provide a general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and a drive 1520, e.g., such as a solid state drive, an optical disk drive, which can read or write from a disk 1522, such as a CD-ROM disc, a DVD, a BD, etc. Alternatively, where a solid state drive is involved, disk 1522 would not be included, unless separate. While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above, such as but not limited to a network virtual machine providing one or more aspects of storage or processing of information. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer-executable components; and
a processor, operably coupled to the memory, that executes the computer-executable components stored in the memory, wherein the computer-executable components comprise:
a key distribution component that distributes functional encryption public keys to respective participants in a vertical federated learning framework governed by a coordinator; and
an inference prevention component that verifies query vectors generated by the coordinator, based on which the key distribution component distributes functional encryption secret keys to the coordinator.

2. The system of claim 1, wherein:
the key distribution component distributes respective feature-dimension public keys and respective sample-dimension public keys to the respective participants, wherein the respective participants send to the coordinator respective local model updates encrypted by the respective feature-dimension public keys and respective local datasets encrypted by the respective sample-dimension public keys;
the inference prevention component verifies a participant-related weight vector generated by the coordinator, based on which the key distribution component distributes to the coordinator a functional feature-dimension secret key that aggregates the encrypted respective local model updates into a sample-related weight vector; and
the inference prevention component verifies the sample-related weight vector, based on which the key distribution component distributes to the coordinator a functional sample-dimension secret key that aggregates the encrypted respective local datasets into an update value for a global model.

3. The system of claim 2, wherein:
the key distribution component generates the respective feature-dimension public keys and the functional feature-dimension secret key via multi-input functional encryption techniques for inner-products, and generates the respective sample-dimension public keys and the functional sample-dimension secret key via single-input functional encryption techniques for inner-products.

4. The system of claim 3, wherein:
the inference prevention component verifies a query vector by determining that a number of non-zero elements of the query vector is above a predetermined threshold, and by determining that a number of training epochs is less than both a maximum number of features and a maximum sample batch size established by the coordinator before beginning a training session.

5. The system of claim 2, wherein the respective participants perform one-way communication with the coordinator, and wherein the respective participants do not communicate with each other.

6. The system of claim 2, wherein only one of the respective participants possesses labels which the global model is trained to predict.

7. The system of claim 2, wherein a number of the respective participants changes between consecutive training iterations of a training session.

8. The system of claim 2, wherein the inference prevention component sends an alert to the respective participants if the participant-related weight vector or the sample-related weight vector is invalid.

9. A computer-implemented method, comprising:
distributing, by a device operatively coupled to a processor, functional encryption public keys to respective participants in a vertical federated learning framework governed by a coordinator; and
verifying, by the device, query vectors generated by the coordinator, and accordingly distributing functional encryption secret keys to the coordinator.

10. The computer-implemented method of claim 9, further comprising:
distributing, by the device, respective feature-dimension public keys and respective sample-dimension public keys to the respective participants, wherein the respective participants send to the coordinator respective local model updates encrypted by the respective feature-dimension public keys and respective local datasets encrypted by the respective sample-dimension public keys;

verifying, by the device, a participant-related weight vector generated by the coordinator, and accordingly distributing to the coordinator a functional feature-dimension secret key that aggregates the encrypted respective local model updates into a sample-related weight vector; and verifying, by the device, the sample-related weight vector, and accordingly distributing to the coordinator a functional sample-dimension secret key that aggregates the encrypted respective local datasets into an update value for a global model.

11. The computer-implemented method of claim 10, further comprising:

generating, by the device, the respective feature-dimension public keys and the functional feature-dimension secret key via multi-input functional encryption techniques for inner-products; and generating, by the device, the respective sample-dimension public keys and the functional sample-dimension secret key via single-input functional encryption techniques for inner-products.

12. The computer-implemented method of claim 11, wherein the verifying query vectors comprises:

determining, by the device, that a number of non-zero elements of a query vector is above a predetermined threshold; and determining, by the device, that a number of training epochs is less than both a maximum number of features and a maximum sample batch size established by the coordinator before beginning a training session.

13. The computer-implemented method of claim 10, wherein the respective participants perform one-way communication with the coordinator, and wherein the respective participants do not communicate with each other.

14. The computer-implemented method of claim 10, wherein only one of the respective participants possesses labels which the global model is trained to predict.

15. The computer-implemented method of claim 10, wherein a number of the respective participants changes between consecutive training iterations of a training session.

16. The computer-implemented method of claim 10, further comprising:

sending, by the device, an alert to the respective participants if the participant-related weight vector or the sample-related weight vector is invalid.

17. A non-transitory computer program product for facilitating universal and efficient privacy-preserving vertical federated learning, the computer program product comprising a computer readable memory having program instructions embodied therewith, the program instructions executable by a processing component to cause the processing component to:

distribute functional encryption public keys to respective participants in a vertical federated learning framework governed by a coordinator; and verify query vectors generated by the coordinator, and accordingly distribute functional encryption secret keys to the coordinator.

18. The non-transitory computer program product of claim 17, wherein the program instructions are further executable to cause the processing component to:

distribute respective feature-dimension public keys and respective sample-dimension public keys to the respective participants, wherein the respective participants send to the coordinator respective local model updates encrypted by the respective feature-dimension public keys and respective local datasets encrypted by the respective sample-dimension public keys;

verify a participant-related weight vector generated by the coordinator, and accordingly distributing to the coordinator a functional feature-dimension secret key that aggregates the encrypted respective local model updates into a sample-related weight vector; and verify the sample-related weight vector, and accordingly distribute to the coordinator a functional sample-dimension secret key that aggregates the encrypted respective local datasets into an update value for a global model.

19. The non-transitory computer program product of claim 18, wherein the program instructions are further executable to cause the processing component to:

generate the respective feature-dimension public keys and the functional feature-dimension secret key via multi-input functional encryption techniques for inner-products; and generate the respective sample-dimension public keys and the functional sample-dimension secret key via single-input functional encryption techniques for inner-products.

20. The non-transitory computer program product of claim 19, wherein the processing component verifies query vectors by:

determining that a number of non-zero elements of a query vector is above a predetermined threshold; and determining that a number of training epochs is less than both a maximum number of features and a maximum sample batch size established by the coordinator before beginning a training session.

* * * * *